(12) United States Patent
Louie et al.

(10) Patent No.: US 12,197,193 B2
(45) Date of Patent: Jan. 14, 2025

(54) CONTINUOUS FLOW MANUFACTURING SYSTEM AND APPARATUS AND METHOD FOR CONTROLLING PROCESS DATA OF A CONTINUOUS FLOW MANUFACTURING PROCESS

(71) Applicant: The Boeing Company, Chicago, IL (US)

(72) Inventors: Michael K. Louie, Renton, WA (US); Jordan S. Erickson, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 388 days.

(21) Appl. No.: 17/523,095

(22) Filed: Nov. 10, 2021

(65) Prior Publication Data

US 2022/0155764 A1    May 19, 2022

Related U.S. Application Data

(60) Provisional application No. 63/115,120, filed on Nov. 18, 2020.

(51) Int. Cl.
*G05B 19/418* (2006.01)
*G06K 7/10* (2006.01)
*G06K 7/14* (2006.01)

(52) U.S. Cl.
CPC ... *G05B 19/41865* (2013.01); *G05B 19/4187* (2013.01); *G06K 7/10366* (2013.01); *G06K 7/1417* (2013.01); *G05B 2219/50397* (2013.01)

(58) Field of Classification Search
CPC .......... G05B 19/41865; G05B 19/4187; G05B 2219/50397; G05B 2219/32015;
(Continued)

(56) References Cited

U.S. PATENT DOCUMENTS 5,711,647 A    1/1998   Slocum
6,592,324 B2   7/2003   Downs et al.
(Continued)

FOREIGN PATENT DOCUMENTS

EP    1 393 873    3/2004
EP    1 995 045    11/2008
(Continued)

OTHER PUBLICATIONS

European Patent Office, Extended European Search Report, App. No. 21207376.1 (Apr. 22, 2022).
(Continued)

*Primary Examiner* — Christopher E. Everett
*Assistant Examiner* — Jonathan Michael Skrzycki
(74) *Attorney, Agent, or Firm* — Walters & Wasylyna LLC

(57) ABSTRACT

A continuous flow manufacturing system includes a tool, configured to hold a part. The system also includes a machine-readable identifier, associated with the tool and encoded with a tool-identification. The system further includes a plurality of workstations. Each one of the plurality of workstations includes a production machine, configured to perform a manufacturing operation on a part, and a reader, configured to read the machine-readable identifier. The system also includes a computing device, configured to retrieve process-data, associated with the tool-identification and a corresponding one of the plurality of workstations, and configured to update the process-data, subsequent to performing the manufacturing operation associated with the corresponding one of the plurality of workstations.

25 Claims, 13 Drawing Sheets

(58) Field of Classification Search
CPC ...... G05B 19/4183; G05B 2219/32252; G06K 7/10366; G06K 7/1417; G06K 7/0004; G06F 16/21; G06F 16/2379; G06Q 50/04
See application file for complete search history.

(56) References Cited

U.S. PATENT DOCUMENTS

| | | | |
|---|---|---|---|
| 7,587,802 B2 | 9/2009 | Tsuchiya et al. | |
| 9,623,611 B2 | 4/2017 | Oldani | |
| 2002/0180960 A1* | 12/2002 | Koren | G01N 21/8803 356/237.2 |
| 2004/0041304 A1* | 3/2004 | Willden | B29C 70/342 425/500 |
| 2009/0033013 A1 | 2/2009 | Cleary et al. | |
| 2011/0178627 A1* | 7/2011 | Wechter | G05B 19/41875 700/109 |
| 2012/0303674 A1* | 11/2012 | Boensch | G06F 16/252 707/802 |
| 2015/0129136 A1 | 5/2015 | Dull et al. | |
| 2015/0198432 A1* | 7/2015 | Clark | G05B 19/402 700/186 |
| 2018/0311887 A1 | 11/2018 | Erickson et al. | |
| 2019/0101889 A1* | 4/2019 | Riek | G05B 19/401 |
| 2019/0196442 A1* | 6/2019 | Ezawa | G05B 19/406 |
| 2019/0301860 A1 | 10/2019 | Moore et al. | |

FOREIGN PATENT DOCUMENTS

| | | |
|---|---|---|
| EP | 2 923 794 | 9/2015 |
| WO | WO 03/037564 | 5/2003 |

OTHER PUBLICATIONS

Netherlands Patent Office, Search Report and Written Opinion, App. No. NL 2027400 (Jul. 1, 2021).

\* cited by examiner

CONTINUOUS FLOW MANUFACTURING SYSTEM AND APPARATUS AND METHOD FOR CONTROLLING PROCESS DATA OF A CONTINUOUS FLOW MANUFACTURING PROCESS

PRIORITY

This application claims priority from U.S. Ser. No. 63/115,120 filed on Nov. 18, 2020.

FIELD

The present disclosure relates generally to manufacturing and, more particularly, to a continuous flow manufacturing system and an associated apparatus and method for controlling a continuous flow manufacturing process.

BACKGROUND

Conventional manufacturing techniques for large parts, such as spars, fuselage sections, wing structures, and other aircraft structures, utilize large fixed-base machines and model-specific, fixed-base tooling. Conventional manufacturing techniques for composite parts utilize fixed-base tooling and batch processing, in which the composite part does not move from one location to another location until full lamination of the part is complete. Neither of these manufacturing techniques lend themselves to continuous flow manufacturing. Accordingly, those skilled in the art continue with research and development efforts in the field of continuous flow manufacturing, particularly in the manufacture of large parts and/or composite parts, and, as such, apparatuses and methods intended to address the above-identified concerns would find utility.

SUMMARY

The following is a non-exhaustive list of examples, which may or may not be claimed, of the subject matter according to the present disclosure.

In an example, a disclosed continuous flow manufacturing system includes a tool, configured to hold a part. The system also includes a machine-readable identifier, associated with the tool and encoded with a tool-identification. The system further includes a plurality of workstations. Each one of the plurality of workstations includes a production machine, configured to perform a manufacturing operation on a part, and a reader, configured to read the machine-readable identifier. The system also includes a computing device, configured to retrieve process-data, associated with the tool-identification and a corresponding one of the plurality of workstations, and configured to update the process-data, subsequent to performing the manufacturing operation associated with the corresponding one of the plurality of workstations.

In an example, an apparatus for controlling a continuous flow manufacturing system includes a database, including process-data associated with the continuous flow manufacturing system. The process-data includes a part-identification, corresponding to a part, a pre-operation condition of the part, prior to performing a manufacturing operation, and operating instructions for a production machine, configured to perform the manufacturing operation. The apparatus also includes a machine-readable identifier, associated with a tool, holding the part, and encoded with a tool-identification, and a reader, configured to read the machine-readable identifier. The apparatus also includes a computing device, in communication with the database, the production machine and the reader. The computing device is configured to identify the tool using the tool-identification and configured to associate the tool-identification with the process-data, corresponding to the part and a workstation of the continuous flow manufacturing system. The computing device is also configured to control operation of the production machine to perform the manufacturing operation. The computing device is further configured to update the process-data to include a post-operation condition of the part, subsequent to performing the manufacturing operation.

In an example, a method for controlling a continuous flow manufacturing system includes steps of: (1) identifying a tool at a workstation of the continuous flow manufacturing system, wherein the workstation implements a manufacturing operation performed on a part held by the tool; (2) associating a tool-identification, corresponding to the tool, with process-data associated with the part and the workstation, wherein the process-data includes a part-identification, corresponding to the part, a pre-operation condition of the part, prior to performing the manufacturing operation, and operating instructions for a production machine to perform the manufacturing operation; (3) performing the manufacturing operation on the part using the production machine; and (4) updating the process-data to further include a post-operation condition of the part, subsequent to performing the manufacturing operation.

Other examples of the disclosed system, apparatus, and method will become apparent from the following detailed description, the accompanying drawings, and the appended claims.

DETAILED DESCRIPTION

Figure 1:
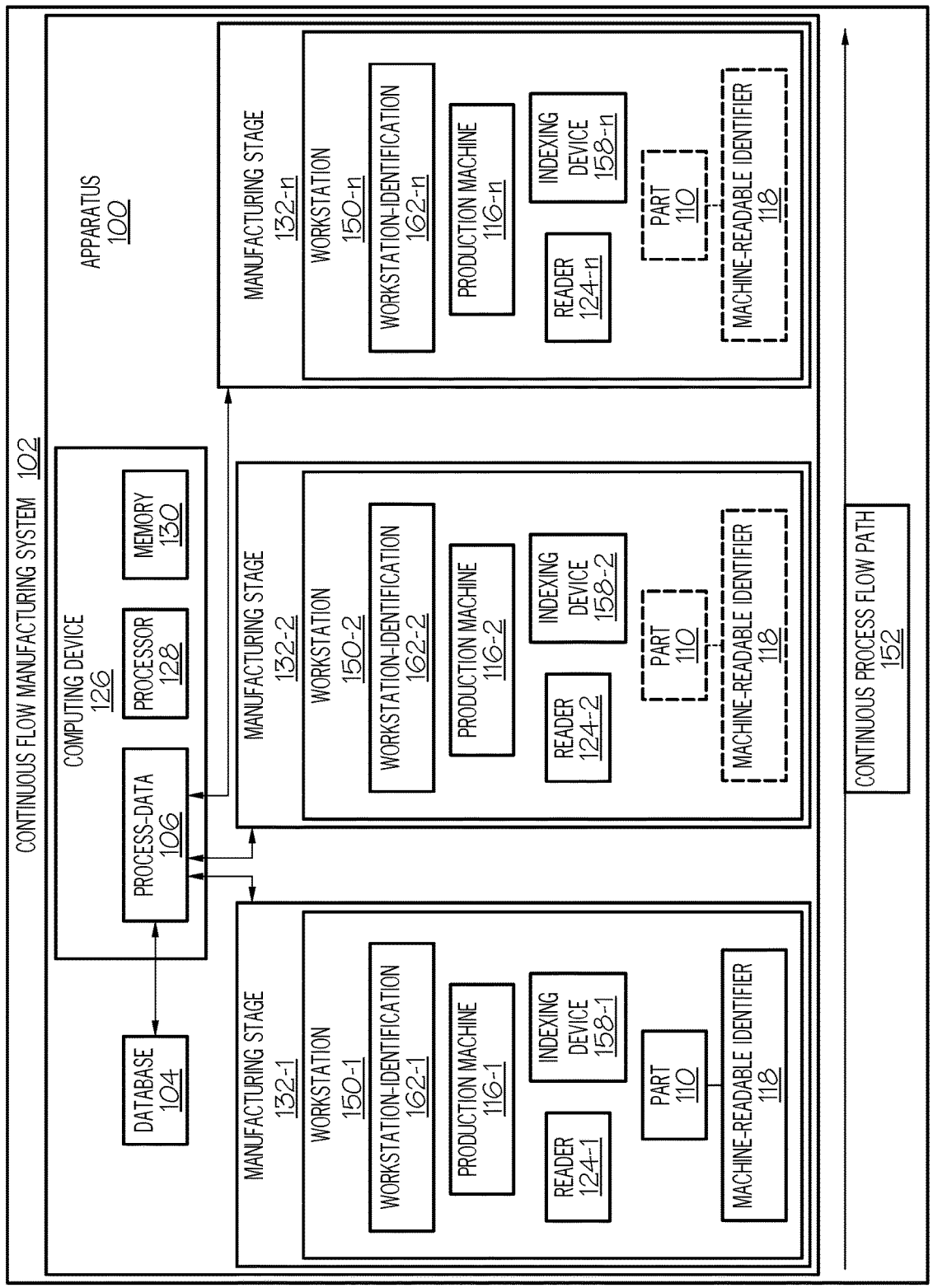
FIG. 1 is a schematic block diagram of an example of a continuous flow manufacturing system.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Continuous flow manufacturing is a process in which a product is manufactured, from start to finish, in one production line. Continuous flow manufacturing is considered by most leading manufacturing experts to be the most efficient manufacturing method. Continuous flow manufacturing is advantageous over conventional batch production techniques in which a product is fully manufactured in a single manufacturing cell or a product is partially manufactured in one independent manufacturing cell, then is moved to another independent manufacturing cell for follow-on manufacturing. The benefits and advantages of continuous flow manufacturing include, but are not limited to, decreased work in progress requirements, decreased floor space requirements, reduced inventory, improved efficiency, reduced product defects, and reduced cycle time.

Continuous flow manufacturing requires the integration of the various elements of the production system and process to achieve continuous movement of the product through the system without separating them into lots or batches. Continuous flow manufacturing also needs to quickly and accurately move tools and parts from one position to another and manage process-related information along the process flow path to achieve consistent quality and repeatable processing times.

Referring generally to FIGS. 1-8, by way of examples, the present disclosure is directed to a continuous flow manufacturing system 102 and an apparatus 100 for controlling the continuous flow manufacturing system 102. Throughout the present disclosure, the continuous flow manufacturing system 102 may also be referred to generally as the system 102. The continuous flow manufacturing system 102 facilitates continuous production of a part 110, in which the part 110 moves from one work process to another in a single sequential flow of a production line (i.e., continuous flow manufacturing).

The system 102 and apparatus 100 disclosed herein perform process management by recording and tracking process-related information, such as tool information, part information, and other work process information, at each stage of a continuous manufacturing process and making such process-related information available throughout the entire production line.

The system 102 and apparatus 100 update the process-related information at each stage of the continuous manufacturing process by tracking movement of a manufactured part from stage to stage throughout the continuous manufacturing process and associating the process-related information with the corresponding part.

The system 102 and apparatus 100 direct production by determining and retrieving the required inputs, the required work processes, and the generated outputs at each stage of the continuous manufacturing process that correspond to the part.

The apparatus 100 advantageously tracks, manages, and controls the flow of information, work processes, and parts within the system 102, which facilitates use of continuous flow manufacturing for various types of parts, such as those that were conventionally not suited for continuous flow manufacturing.

The system 102 and apparatus 100 disclosed herein facilitate communication between the various manufacturing stages of the process by maintaining process-related information throughout the production line of the continuous manufacturing process. The system 102 and apparatus 100 disclosed herein facilitate continuous flow manufacturing of large parts, such as spars, fuselage sections, wing structures, and other aircraft structures, and/or composite parts by identifying and accurately locating non-fixed-base tooling throughout the continuous manufacturing process. The system 102 and apparatus 100 disclosed herein further facilitate continuous flow manufacturing of large parts and/or composite parts by updating the process-related information at each manufacturing stage and transferring the process-related information throughout the continuous manufacturing process.

Referring to FIG. 1, in one or more examples, the continuous flow manufacturing system 102 includes a plurality of workstations 150 (generally identified herein collectively as workstations 150 and individually as workstation 150). In FIG. 1, examples of the plurality of workstations 150 are identified individually as workstation 150-1, workstation 150-2, and workstation 150-n. In various examples, the continuous flow manufacturing system 102 includes any number ("n") of workstations 150.

In one or more examples, each one of the workstations 150 is the same, for example, each one of the workstations 150 performs substantially the same manufacturing operation on the part 110. In one or more examples, at least one of the workstations 150 is different than at least another one of the workstations 150, for example, at least one of the workstations 150 performs a different manufacturing operation on the part 110. In one or more examples, each one of the workstations 150 is different, for example, each one the workstations 150 performs a different manufacturing operation on the part 110.

Each one of the plurality of workstations 150 is associated with at least one of a plurality of manufacturing stages 132 (generally identified herein collectively as manufacturing stages 132 and individually as manufacturing stage 132) of the continuous flow manufacturing system 102. In FIG. 1, examples of the plurality of manufacturing stages 132 are identified individually as manufacturing stages 132-1, manufacturing stages 132-2, and manufacturing stages 132-*n*. In various examples, the continuous flow manufacturing system 102 includes any number ("n") of manufacturing stages 132.

In one or more examples, the workstations 150 are arranged in a series along a continuous process flow path 152 (indicated by a directional arrow) to form a production line. At least one manufacturing operation is performed on the part 110 at each one of the workstations 150 or at least one work process is associated with each one of the manufacturing stages 132. In these examples, each subsequent manufacturing operation or work process picks up from where a preceding manufacturing operation or work process leaves off. In one or more examples, one workstation 150 (e.g., associated with one manufacturing stage 132) works on the part 110 at a time. In one or more examples, more than one workstation 150 (e.g., associated with more than one manufacturing stage 132) works on the part 110 at a time.

For example, the part 110 is moved to one of the workstations 150, where at least one manufacturing operation or work process is performed on the part 110. Following performance of the manufacturing operation or work process, the part 110 is sequentially moved to a subsequent one of the workstations 150, where at least one subsequent manufacturing operation or work process is performed on the part 110. In one or more examples, at least one manufacturing operation is completed at a given workstation 150 before advancing the part 110 to the next workstation 150. In one or more examples, at least one manufacturing operation is partially completed at a given workstation 150 and is then handed off to the next workstation 150 for completion. This process is repeated in series along the production line as the part 110 moves from one workstation 150 to another in a sequential flow until all manufacturing operations or work processes are complete.

Referring to FIGS. 2A, 2B, 3A and 3B, in one or more examples, each one of the workstations 150 includes a part-input 246, a part-output 248, and a material-input 250. The part-input 246 facilitates advancement of the part 110 to or within the workstation 150. The part-output 248 facilitates advancement of the part 110 from the workstation 150. The material-input 250 facilitates the supply of materials used in the manufacturing operation.

Figure 2A:
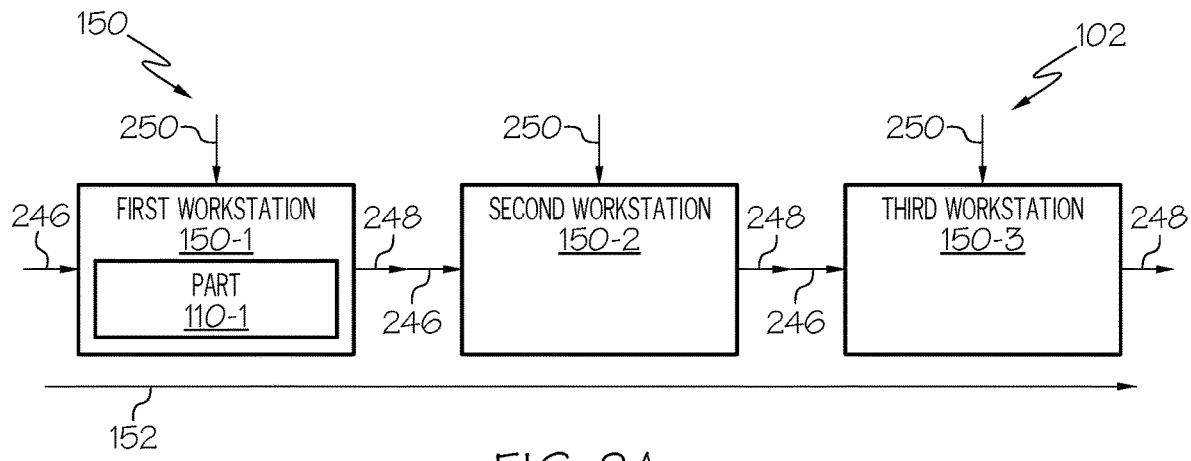
FIGS. 2A, 2B and 2C, in combination, schematically illustrate an example of a part advancing through a plurality of workstations of the continuous flow manufacturing system.
Figure 2B:
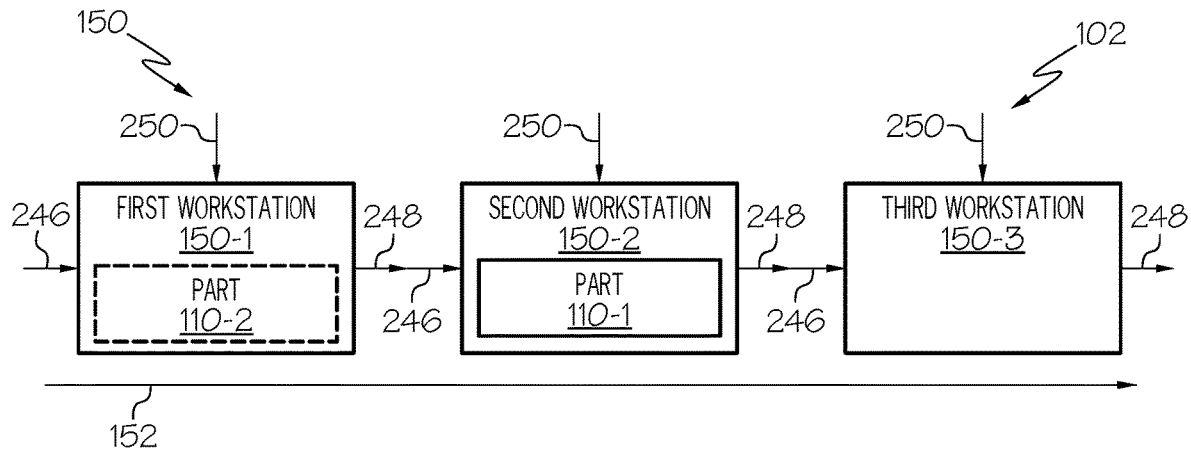
Figure 2C:
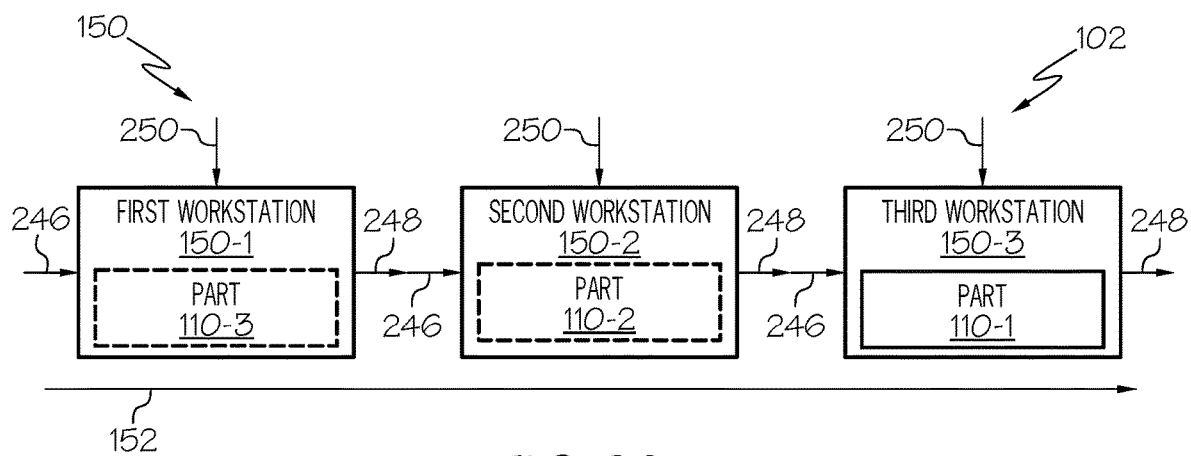

Referring, collectively, to FIGS. 2A, 2B and 2C, in an example implementation of the continuous manufacturing process, an entirety of the part 110 is located at, or within, one of the workstations 150 to facilitate a manufacturing operation being performed on the part 110.

As illustrated in FIG. 2A, a first part 110-1 is moved to a first workstation 150-1. A first manufacturing operation, associated with the first workstation 150-1, is performed on the first part 110-1.

As illustrated in FIG. 2B, upon completion of the first manufacturing operation, the first part 110-1 is advanced to a second workstation 150-2. A second manufacturing operation, associated with the second workstation 150-2, is then performed on the first part 110-1.

As illustrated in FIG. 2C, upon completion of the second manufacturing operation, the first part 110-1 is advanced to a third workstation 150-3. A third manufacturing operation, associated with the third workstation 150-3, is performed on the first part 110-1.

This process is repeated at any number of subsequent workstations 150-*n* (FIG. 1) along the continuous process flow path 152 until a full work process, associated with the series of workstations 150, is completed for the first part 110-1.

As illustrated in FIG. 2B, in one or more examples, a second part 110-2 follows the first part 110-1 and enters the first workstation 150-1. The first manufacturing operation, associated with the first workstation 150-1, is performed on the second part 110-2.

As illustrated in FIG. 2C, in one or more examples, upon completion of the first manufacturing operation, the second part 110-2 is advanced to the second workstation 150-2. The second manufacturing operation, associated with the second workstation 150-2, is then performed on the second part 110-2. In one or more examples, a third part 110-3 follows the second part 110-2 and enters the first workstation 150-1. The first manufacturing operation, associated with the first workstation 150-1, is performed on the third part 110-3.

In one or more examples, the first part 110-1, the second part 110-2, and the third part 110-3 are the same type or model of part. In one or more examples, at least one of the first part 110-1, the second part 110-2, and the third part 110-3 is a different type or model of part than at least another one of at least one of the first part 110-1, the second part 110-2, and the third part 110-3.

This process is repeated at any number of subsequent workstations 150-*n* (FIG. 1) along the continuous process flow path 152 until a full work process, associated with the series of workstations 150, is completed for each one of the first part 110-1, the second part 110-2, and the third part 110-3. While only three parts 110 are illustrated by example in FIGS. 2A, 2B, and 2C, it can be appreciated that any number of parts 110 can advance through the series of workstations 150.

Figure 3A:
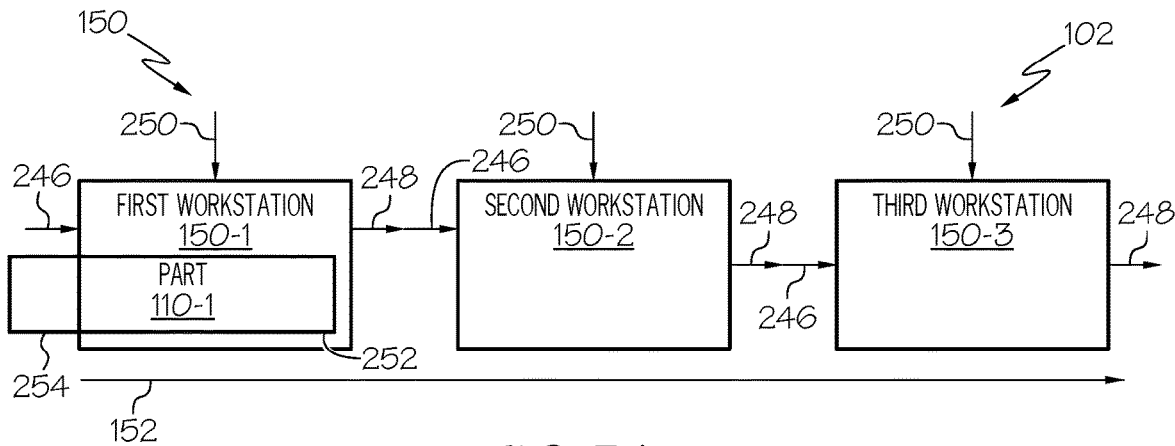
FIGS. 3A, 3B and 3C, in combination, schematically illustrate another example of the part advancing through the plurality of workstations of the continuous flow manufacturing system.
Figure 3B:
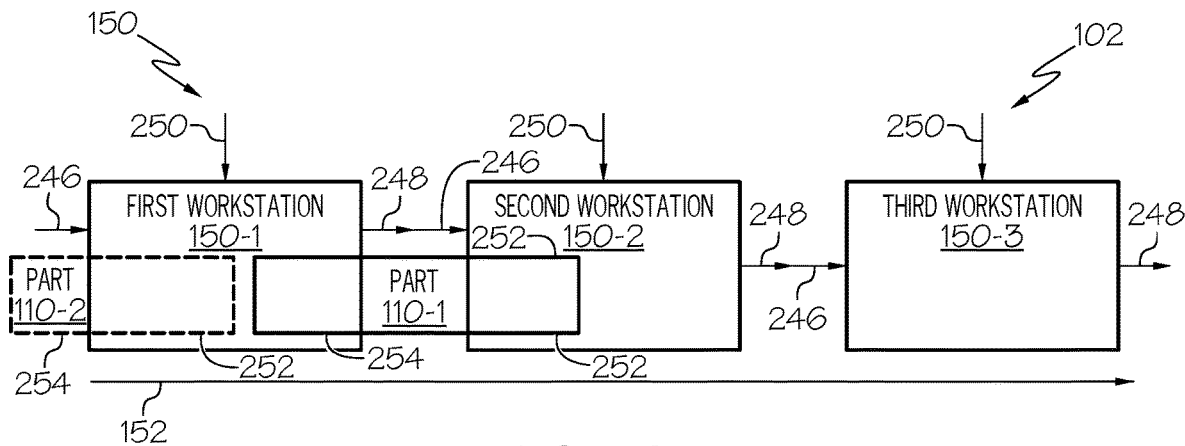
Figure 3C:
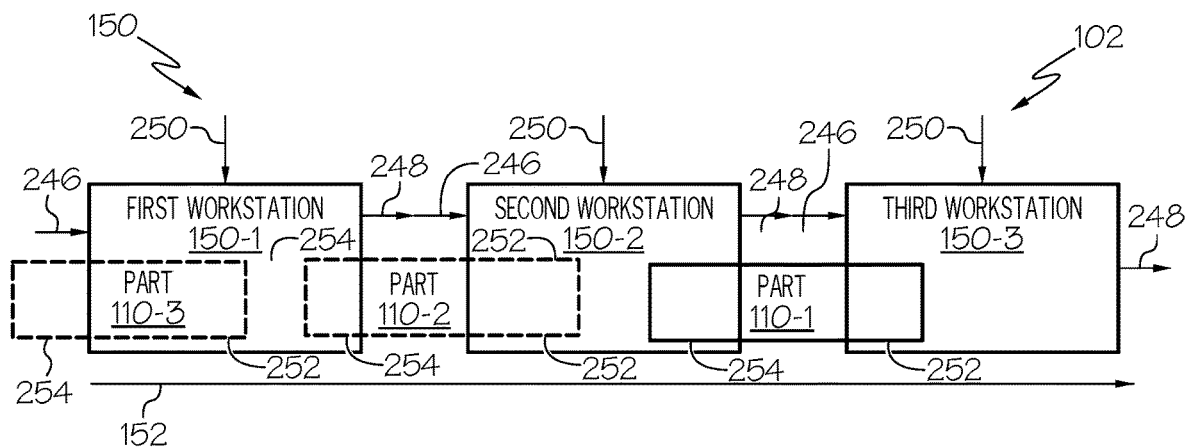

Referring, collectively, to FIGS. 3A, 3B and 3C, in an example implementation of the continuous manufacturing process, the part 110 is located at, or within, more than one of the workstations 150 to facilitate more than one manufacturing operation being concurrently performed on the part 110. In one or more examples, the part 110 includes a leading portion 252 (e.g., a first portion) and a trailing portion 254 (e.g., a second portion).

As illustrated in FIG. 3A, in one or more examples, the leading portion 252 of the first part 110-1 is moved to the first workstation 150-1. A first manufacturing operation, associated with the first workstation 150, is performed on the leading portion 252 of the first part 110-1.

As illustrated in FIG. 3B, upon completion of the first manufacturing operation on the leading portion 252 of the first part 110-1, the first part 110-1 is advanced to the second workstation 150-2 such that the leading portion 252 of the first part 110-1 is located at, or within, the second workstation 150-2 and the trailing portion 254 of the part 110 is located at, or within, the first workstation 150-1. The first manufacturing operation, associated with the first workstation 150-1, is performed on the trailing portion 254 of the first part 110-1 and a second manufacturing operation, associated with the second workstation 150-2, is performed on the leading portion 252 of the first part 110-1.

As illustrated in FIG. 3C, upon completion of the second manufacturing operation on the leading portion 252 of the first part 110-1 and the first manufacturing operation on the trailing portion 254 of the first part 110-1, the first part 110-1 is advanced to the third workstation 150-3 such that the leading portion 252 of the first part 110-1 is located at, or within, the third workstation 150-3 and the trailing portion 254 of the first part 110-1 is located at, or within, the second workstation 150-2. The second manufacturing operation, associated with the second workstation 150-2, is performed on the trailing portion 254 of the first part 110-1 and a third manufacturing operation, associated with the third workstation 150-3, is performed on the leading portion 252 of the first part 110-1.

This process is repeated at any number of subsequent workstations 150-*n* (FIG. 1) along the continuous process flow path 152 until a full work process, associated with the series of workstations 150, is completed for the first part 110-1.

As illustrated in FIG. 3B, in one or more examples, a second part 110-2 follows the first part 110-1 and the leading portion 252 of the second part 110-2 enters the first workstation 150-1. The first manufacturing operation, associated with the first workstation 150-1, is performed on the leading portion 252 of the second part 110-2.

As illustrated in FIG. 3C, in one or more examples, upon completion of the first manufacturing operation on the leading portion 252 of the second part 110-2, the second part 110-2 is advanced to the second workstation 150-2 such that the leading portion 252 of the second part 110-2 is located at, or within, the second workstation 150-2 and the trailing portion 254 of the second part 110-2 is located at, or within, the first workstation 150-1. The second manufacturing operation, associated with the second workstation 150-2, is then performed on the leading portion 252 of the second part 110-2 and the first manufacturing operation, associated with the first workstation 150-1 is performed on the trailing portion 254 of the second part 110-2. In one or more examples, a third part 110-3 follows the second part 110-2 and the leading portion 252 of the third part 110-3 enters the first workstation 150-1. The first manufacturing operation, associated with the first workstation 150-1, is performed on the leading portion 252 of the third part 110-3.

In one or more examples, the first part 110-1, the second part 110-2, and the third part 110-3 are the same type or model of part. In one or more examples, at least one of the first part 110-1, the second part 110-2, and the third part 110-3 is a different type or model of part than at least another one of at least one of the first part 110-1, the second part 110-2, and the third part 110-3.

This process is repeated at any number of subsequent workstations 150-*n* (FIG. 1) along the continuous process flow path 152 until a full work process, associated with the series of workstations 150, is completed for each one of the first part 110-1, the second part 110-2, and the third part 110-3. While only three parts 110 are illustrated by example in FIGS. 3A, 3B, and 3C, it can be appreciated that any number of parts 110 can advance through the series of workstations 150.

In the illustrated examples, each part 110 is concurrently located in two workstations 150 for performance of two manufacturing operation, associated with the two workstations 150. For example, as illustrated in FIG. 3C, the leading portion 252 of the first part 110-1 is located at the third workstation 150-3 for performance of the third manufacturing operation on the leading portion 252. The trailing portion 254 of the first part 110-1 is located at the second workstation 150-2 for performance of the second manufacturing operation on the trailing portion 254. However, in one or more examples, each part 110 may be concurrently located in more than two workstations 150 for performance of more than two manufacturing operations, associated with the more than two workstations 150. For example (not explicitly illustrated), the leading portion 252 of the first part 110-1 is located at the third workstation 150-3 for performance of the third manufacturing operation on the leading portion 252. The trailing portion 254 of the first part 110-1 is located at the first workstation 150-1 for performance of the first manufacturing operation on the trailing portion 254. An intermediate portion of the first part 110-1 (located between the leading portion 252 and the trailing portion 254) is located at the second workstation 150-2 for performance of the second manufacturing operation on the intermediate portion.

It can be appreciated that in some examples of the continuous manufacturing process, the part 110 is located at, or within, more than two workstations 150 at a given point of the continuous manufacturing process. In other words, the part 110 extends between two or more workstations 150 at a time as the part 110 advances through the system 102.

In the above examples, illustrated in FIGS. 2A, 2B, 3A and 3B, the second manufacturing operation continues from (e.g., builds on or is otherwise a subsequent operation to) the first manufacturing operation. The third manufacturing operation continues from the second manufacturing operation and so on.

In an example, the first manufacturing operation may place first composite plies of a laminate at a first orientation (e.g., 0-degrees), the second manufacturing operation may place second composite plies of the laminate at a second orientation (e.g., +/−90-degrees), and the third manufacturing operation may place third composite plies of the laminate at a third orientation (e.g., +/−45-degrees), and so on.

In another example, the first manufacturing operation may machine a part, the second manufacturing operation may trim or finish the part, and the third manufacturing operation may inspect the part (e.g., non-destructive inspection).

In various examples, the system 102 and apparatus 100 employ either a continuous-flow manufacturing process or a pulse-flow manufacturing process. In the continuous-flow manufacturing process, the part 110 continually moves along the continuous process flow path 152 while the work process is being performed. In other words, in the continuous-flow manufacturing process, performance of the manufacturing operation occurs during continuous advancement of the part 110. In the pulse-flow manufacturing process, the part 110 is alternately halted, or paused, for work processes to be performed and is then moved or "pulsed" farther down the continuous process flow path 152 to another location at which the part 110 is again stopped for the performance of further work processes. In other words, in the pulse-flow manufacturing process, performance of the manufacturing operation occurs during the pause between pulses. Accordingly, the system 102 and apparatus 100 disclosed herein are suitable for either a pulse-flow or continuous-flow process.

In an example, the pulse-flow manufacturing process includes a full pulse operation. For the purpose of the present disclosure, "full pulse" refers to advancement of the part 110 in which a complete manufacturing operation is performed during the pause between pulses. For example, full pulse is where the part is advanced its full length during the pulse. In one or more examples, the part 110 is advanced, or fully pulsed, into the workstation 150, then advancement of the part 110 is paused. The manufacturing operation is performed on the part 110 during the pause. Upon completion of the manufacturing operation associated with the workstation 150, the part 110 is advanced (e.g., fully pulsed)

to the next workstation 150. This process is repeated through all the workstations 150 to complete a full work process.

In another example, the pulse-flow manufacturing process includes a partial pulse operation. For the purpose of the present disclosure, "partial pulse" refers to advancement of the part 110 in which a portion of the manufacturing operation (e.g., partial completion of the manufacturing operation) is performed during the pause between pulses. For example, a partial pulse is where the part is advanced less than its full length during the pulse. In one or more examples, the part 110 is advanced, or partially pulsed, into the workstation 150, then advancement of the part 110 is paused. A first portion of the manufacturing operation is performed on the part 110 during the pause. (e.g., partial completion of the manufacturing operation). The part 110 is then advanced (e.g., partially pulsed) but remains within the workstation 150. Advancement of the part 110 is then paused again and a second portion of the manufacturing operation is performed on the part 110 during the second pause (e.g., partial completion of the manufacturing operation). This process is repeated through the workstation 150 until completion of the manufacturing operation associated with the workstation 150. This process is then repeated through all the workstations 150 to complete the full work process.

In either the continuous-flow manufacturing process or the pulse-flow manufacturing process, upon completion of the manufacturing operation associated with the particular workstation 150, the part 110 is advanced (e.g., continuously or pulsed) out from the workstation 150 and is advanced (e.g., continuously or pulsed) into the next workstation 150. For the purpose of the present disclosure, the phrases "completion of the manufacturing operation," "complete manufacturing operation," and similar phrases refer to completion of the work assigned to and performed by an associated workstation 150. Accordingly, completion of the manufacturing operation or a complete manufacturing operation associated with a particular workstation 150 may be less than a full work process required to complete the part 110. For the purpose of the present disclosure, the phrases "partial completion of the manufacturing operation," "partially complete manufacturing operation," and similar phrases refer to completion of a portion the work assigned to and performed by an associated workstation 150. For example, a full work process for making the part 110 may include laying down a plurality of composite plies to form a stacked composite-ply layup (i.e., the part 110). A first manufacturing operation, associated with the first workstation 150-1, may be to lay down one or more composite plies at a first orientation (e.g., 0-degrees) to form a portion of the part 110. Following completion of the first manufacturing operation, the part 110 is advanced (e.g., continuously or pulsed) to the second workstation 150-2. A second manufacturing operation, associated with the second workstation 150-2, may be to lay down one or more composite plies at a second orientation to form another portion of the part 110. The second orientation may be the same as the first orientation (e.g., 0-degrees) or may be at a different orientation (e.g., +/−90-degrees, +/−45-degrees, etc.). Following completion of the second manufacturing operation, the part 110 is advanced (e.g., continuously or pulsed) to the third workstation 150-3. A third manufacturing operation, associated with the third workstation 150-3, may be to lay down one or more composite plies at a third orientation to form another portion of the part 110. The third orientation may be the same as the first and/or second orientations or may be at a different orientation. This process continues through additional workstations 150 until the full work process is finished. Thus, in this example, each manufacturing operation associated with each workstation 150 is less than the full work process and forms a portion of the full work process required to make the part 110.

Figure 4:
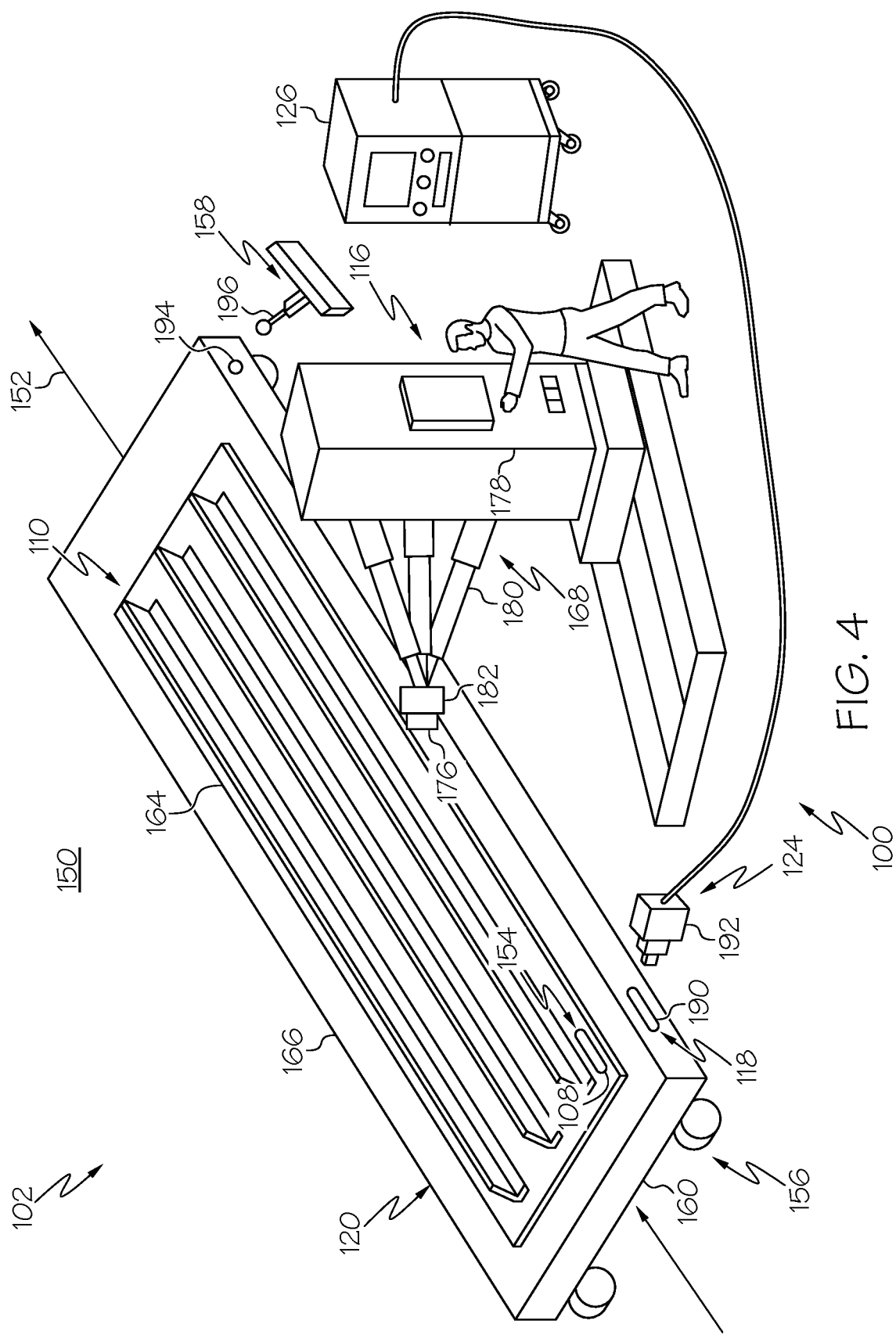
FIG. 4 is a schematic illustration of an example of a workstation of the continuous flow manufacturing system.
Figure 5:
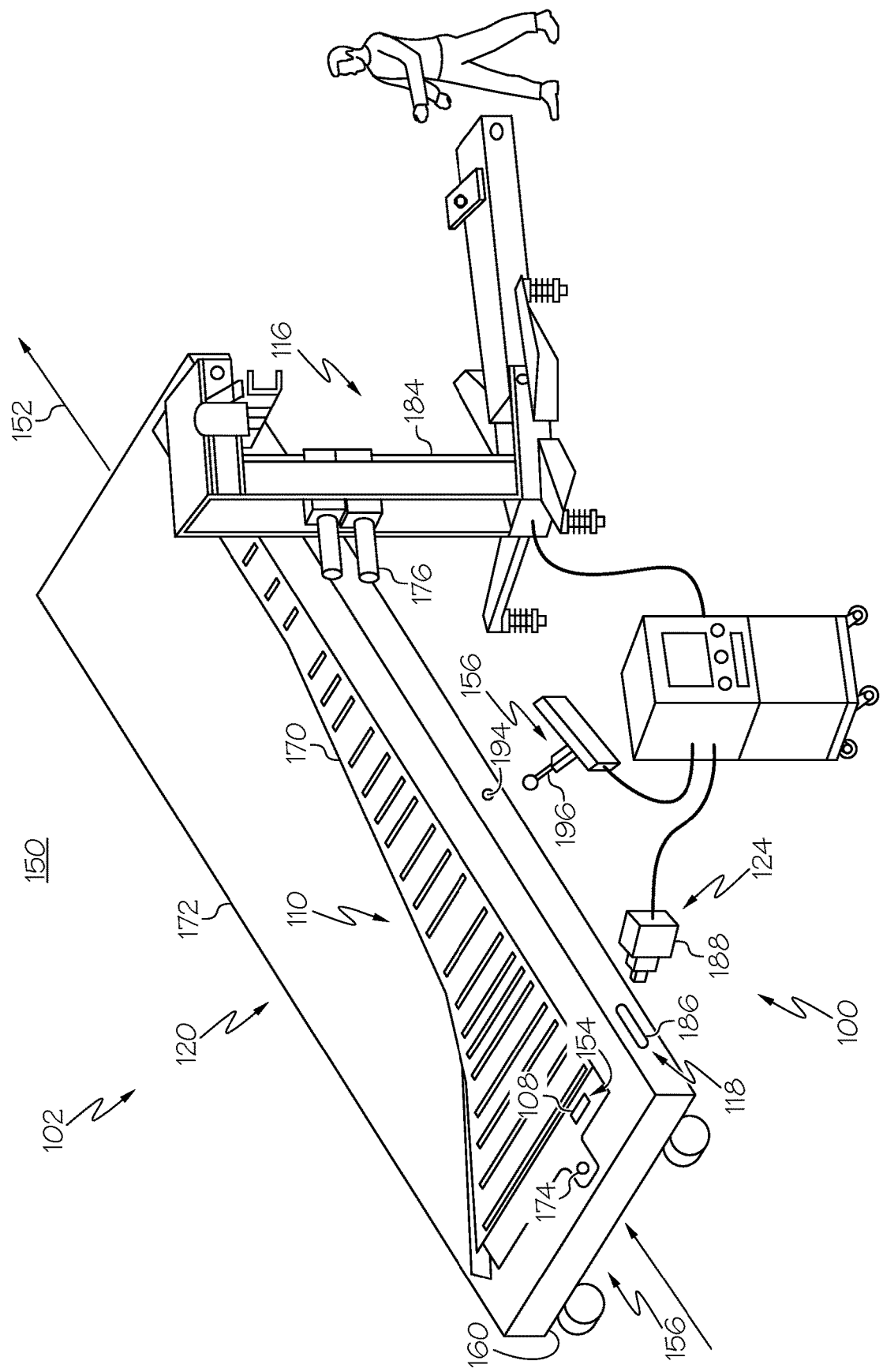
FIG. 5 is a schematic illustration of another example of the workstation of the continuous flow manufacturing system.

Referring to FIGS. 1, 4 and 5, in one or more examples, the system 102 includes a plurality of production machines 116 (generally identified herein collectively as production machines 116 and individually at production machine 116). Each one of the plurality of workstations 150 includes at least one production machine 116. In FIG. 1, examples of the plurality of production machines 116 are identified individually as production machine 116-1, production machine 116-2, and production machine 116-*n*. Each one of the production machines 116 is configured to perform the manufacturing operation associated with a corresponding one of the workstations 150 (e.g., the manufacturing stage 132 of the continuous manufacturing process). In FIG. 4, an example of the part 110 is illustrated as a panel structure having a plurality of elongate stiffeners situated on a major surface. However, the example workstation 150 illustrated in FIG. 4 can be used to form any number of or different types of parts, bigger or smaller than the illustrated panel structure, such as, but not limited to, a wing skin panel, a fuselage skin panel, a nacelle skin panel, a horizontal or vertical stabilizer skin panel, a frame, a floor beam, and the like. In FIG. 5, an example of the part 110 is illustrated as a spar. However, the example workstation 150 illustrated in FIG. 5 can be used to form any number of or different types of parts, bigger or smaller than the illustrated spar, such as, but not limited to, a wing skin panel, a fuselage skin panel, a nacelle skin panel, a horizontal or vertical stabilizer skin panel, a frame, a floor beam, and the like.

While the illustrated examples of the system 102 depict one production machine 116 associated with each one of the workstations 150, in other examples, each one of the workstations 150 includes any number of production machines 116, each of which is associated with any number of work processes or manufacturing operations.

In one or more examples, the production machine 116 of each one of the workstations 150 is the same, for example, each one of the production machines 116 performs substantially the same manufacturing operation on the part 110. In one or more examples, the production machine 116 of at least one of the workstations 150 is different than the production machine 116 of at least another one of the workstations 150, for example, at least one of the production machines 116 performs a different manufacturing operation on the part 110. In one or more examples, the production machine 116 of each one of the workstations 150 is different, for example, each one of the production machine 116 performs a different manufacturing operation on the part 110.

In an example, a location of the production machine 116 is fixed relative to the workstation 150 (e.g., the production machine 116 is a fixed-base machine). In another example, the location of the production machine 116 is adjustable relative to the workstation 150 (e.g., the production machine 116 is a non-fixed-base machine).

The production machine 116 includes, or takes the form of, any suitable manufacturing equipment. In an example, the production machine 116 is fully automated, for example, operating entirely under computer control. In another example, the production machine 116 is partially automated, for example, operating under a combination of computer control and manual control. In yet another example, the production machine 116 is manually operated, for example, operating entirely under manual control.

Referring to FIG. 4, in one or more examples, the production machine 116 includes, or takes the form of, a robot 178 that includes, for example, a robotic arm 180, having multiple degrees of freedom, and an end effector 182 that is coupled to a working end of the robotic arm 180. The end effector 182 includes, or takes the form of, at least one machine tool 176 that is configured to perform at least one manufacturing operation on the part 110. The robotic arm 180 is configured to move the end effector 182 along a predetermined toolpath under computer control relative to the part 110.

In one or more examples (not illustrated), the robot 178 includes, or takes the form of, an overhead, gantry robot that is configured to move the end effector 182 along the predetermined toolpath under computer control relative to the part 110.

Referring to FIG. 5, in one or more examples, the production machine 116 includes, or takes the form of, a frame 184 that supports at least one machine tool 176, configured to perform at least one manufacturing operation on the part 110. The frame 184 is movable, either under computer control or manually, in one or more directions to position the machine tool 176 relative to the part 110.

In one or more examples (not illustrated), the frame 184 includes, or takes the form of, an overhead, gantry that is configured to support and move the machine tool 176 relative to the part 110.

Figure 6:
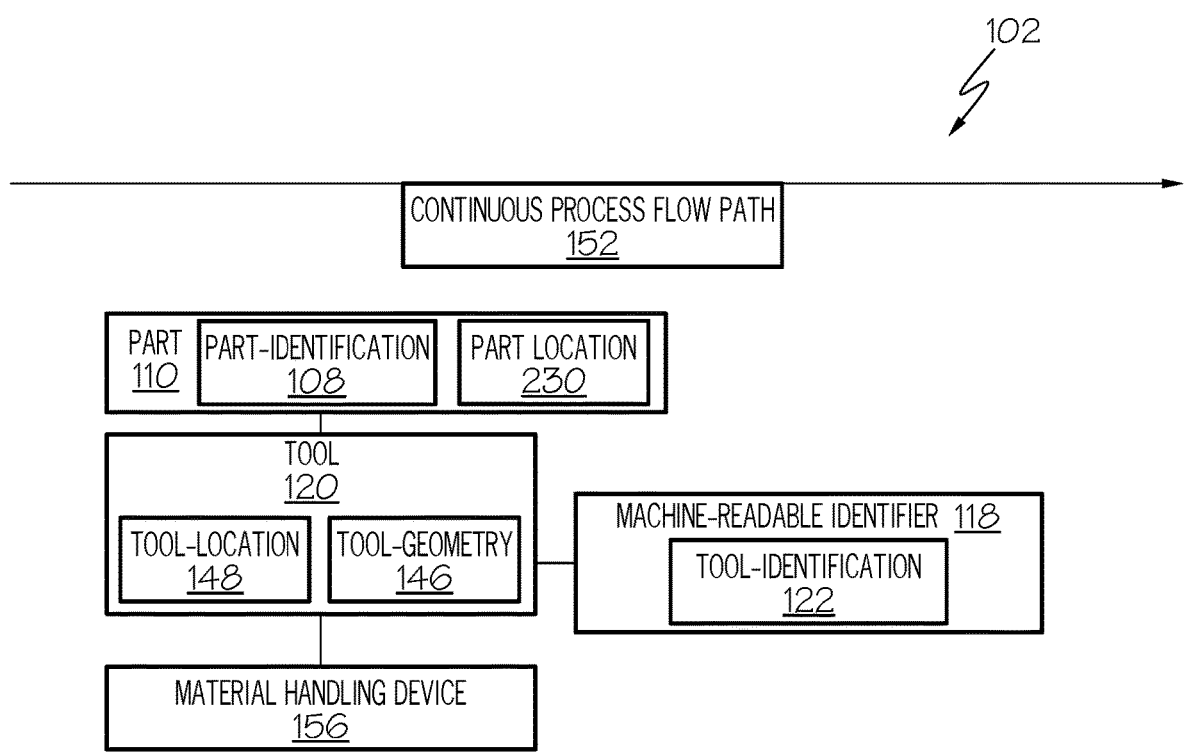
FIG. 6 is a schematic block diagram of an example of the part and a tool, supporting the part, of the continuous flow manufacturing system.

Referring to FIGS. 4-6, in one or more examples, the system 102 includes a material handling device 156. The material handling device 156 is configured to transport the part 110 between the plurality of workstations 150 along the continuous process flow path 152. In an example, the material handling device 156 includes a tool 120. The tool 120 is configured to hold the part 110. In another example, the tool 120 and the material handling device 156 are separate components and the material handling device 156 is configured to transport the tool 120, holding the part 110, between the workstations 150 along the continuous process flow path 152.

In one or more examples, the system 102 includes any number of tools 120. In an example, each tool 120 has a corresponding material handling device 156. In another example, a single material handling device 156 is configured to move any number of different tools 120 at different times.

Referring still to FIGS. 4-6, in one or more examples, the system 102 includes a machine-readable identifier 118. The machine-readable identifier 118 is associated with the tool 120 and is encoded with a tool-identification 122. In an example, machine-readable identifier 118 is a part of the material handling device 156. In one or more examples, the machine-readable identifier 118 is coupled to the tool 120.

In one or more examples, the tool-identification 122 includes, or takes the form of, a number, alphanumeric code, or other unique identification data encoded on the machine-readable identifier 118 and associated with the tool 120. In one or more examples, the tool-identification 122 is also associated with various other information about the tool 120 and/or the part 110 to which the machine-readable identifier 118 is associated.

Referring to FIGS. 1, 4 and 5, in one or more examples, the system 102 includes a plurality of readers 124 (generally identified herein collectively as readers 124 and individually at reader 124). Each one of the workstations 150 includes at least one reader 124. In FIG. 1, examples of the plurality of readers 124 are identified individually as reader 124-1, reader 124-2, and reader 124-n.

The reader 124 is configured to read the machine-readable identifier 118. The reader 124 is configured to recognize the machine-readable identifier 118, decode the data (e.g., the tool-identification 122) stored on the machine-readable identifier 118, and send the data to a computing device 126. The reader 124 and the machine-readable identifier 118 facilitate management and transfer of information related to the tool 120, the part 110, and the various work processes performed on the part 110 as the part 110 travels along the continuous process flow path 152 between the various manufacturing stages 132 or workstations 150.

For example, as will be described in more detail herein, the machine-readable identifier 118 identifies at least one of the type of part, the model of the part, the size of the part, the orientation of the part, the work that needs to be performed on the part at a given workstation, and other information related to the part, the tool, the workstation, and/or the manufacturing operation.

While the illustrated examples of the system 102 depict one machine-readable identifier 118 associated with the tool 120, in other examples, the tool 120 includes any number of machine-readable identifiers 118. While the illustrated examples of the system 102 depict one reader 124 associated with each one of the workstations 150, in other examples, each one of the workstations 150 includes any number of readers 124. Alternatively, in other examples, the reader 124 is associated with more than one workstation 150.

Referring to FIG. 4, in one or more examples, the machine-readable identifier 118 includes, or takes the form of, a radio-frequency identification tag 190. In these examples, the reader 124 includes, or takes the form of, a radio-frequency identification reader 192. In some examples, the radio-frequency identification tag 190 is advantageous because it does not require line of sight to identify and track the tool 120.

The radio-frequency identification tag 190 includes any suitable radio-frequency identification device that uses electromagnetic fields to automatically identify a tag that contains electronically stored information and is attached to an object. In an example, the radio-frequency identification tag 190 is a passive tag. In another example, the radio-frequency identification tag 190 is an active tag that includes a local power source (e.g., a battery). The radio-frequency identification reader 192 includes any suitable radio-frequency identification (RFID) reader that is configured to receive radio signals from the tag, decode the data stored on the tag, and send the data to the computing device 126. For example, the radio-frequency identification reader 192 includes, or takes the form of, one of a passive reader active tag (PRAT) system, an active reader passive tag (ARPT) system, or an active reader active tag (ARAT) system, depending on the type of radio-frequency identification tag 190 used.

Referring to FIG. 5, in one or more examples, the machine-readable identifier 118 includes, or takes the form of, a matrix barcode 186. In these examples, the reader 124 includes, or takes the form of, an optical scanner 188. In some examples, the matrix barcode 186 is advantageous because it reduces the complexity and cost associated with identifying and tracking the tool 120 and is better suited for a high-temperature environment than other alternatives.

The matrix barcode 186 includes any suitable one-dimensional or two-dimensional code that is encoded with data (e.g., text, numeric, alphanumeric, or byte/binary data), which is represented in a visual, machine-readable form. In an example, the matrix barcode 186 is a Quick Response (QR) code. The optical scanner 188 includes any suitable barcode reader or scanner that is configured to read printed barcodes, decode the data contained in the barcode, and send the data to the computing device 126.

The continuous manufacturing process performed by the system 102 and controlled by the apparatus 100 includes any suitable manufacturing process. Similarly, the manufacturing operation, performed by the production machine 116 at each one of the workstations 150, includes any one of various operations, such as at least one of a subtractive manufacturing operation and an additive manufacturing operation. It can be appreciated that the particular manufacturing process or the particular manufacturing operation may depend on various factors, such as the type of part being produced, the material composition of the part, the work being performed on the part, the stage of completion of the part, and the like.

Referring to FIG. 4, in one or more examples, the part 110 includes, or takes the form of, a pre-cure composite laminate 164, such as a layup of a pre-impregnated composite material. In these examples, the manufacturing operation includes a pre-cure composite assembly operation or other additive manufacturing operation performed on the pre-cure composite laminate 164, such as a composite layup operation and a composite lamination operation. In these examples, the tool 120 includes, or takes the form of, a mandrel-tool 166. The mandrel-tool 166 is configured to support the composite laminate 164. In these examples, the production machine 116 is configured to perform an additive manufacturing operation, such as the composite layup operation and/or the composite lamination operation, on the part 110 (e.g., the composite laminate 164). For example, the production machine 116 includes, or takes the form of, a fiber placement machine 168, such as an automated fiber placement (AFP) machine, an automated tape laying (ATL) machine, and the like.

Referring to FIG. 5, in one or more examples, the part 110 includes, or takes the form of, a post-cure composite structure, a metallic structure, a plastic structure, or other non-composite structure (generally referred to as a structure 170). In these examples, the manufacturing operation includes any appropriate additive manufacturing operation, such as an assembly operation, or subtractive manufacturing operation, such as a machining operation. In these examples, the tool 120 includes, or takes the form of, a fixture-tool 172. The fixture-tool 172 is configured to support the structure 170. For example, the fixture-tool 172 includes at least one holding-feature 174 that is configured to secure the structure 170 to the fixture-tool 172 at a known, fixed location relative to the fixture-tool 172. In these examples, the production machine 116 is configured to perform at least one of a subtractive manufacturing operation and an additive manufacturing operation on the structure 170. As an example, the production machine 116 is configured to perform a machining operation on the structure 170, such as turning, drilling, milling, and the like. As another example, the production machine 116 is configured to perform an assembly operation on the structure 170, such as fastening and the like. As another example, the production machine 116 is configured to build up layers to form the structure 170 by depositing material using an additive manufacturing technique, such as laser sintering, laser melting, and the like. For example, the production machine 116 includes, or takes the form of, any appropriate machine tool 176, such as a drilling, a milling machine, a robotic manipulator, a welding machine, an additive manufacturing machine, and the like.

FIG. 4 depicts an example of one of the plurality of workstations 150 in which the production machine 116 takes the form of the robot 178 that supports the machine tool 176, configured to perform the manufacturing operation on the pre-cure composite laminate 164, the machine-readable identifier 118 takes the form of the radio-frequency identification tag 190, coupled to the mandrel-tool 166, and the reader 124 takes the form of the radio-frequency identification reader 192. However, any one of the workstations 150 is not limited to this configuration or combination of components. In one or more examples, the production machine 116 takes the form of the frame 184 (FIG. 5) that supports the machine tool 176, configured to perform the manufacturing operation on the pre-cure composite laminate 164. In one or more examples, the machine-readable identifier 118 takes the form of the matrix barcode 186 (FIG. 5), coupled to the mandrel-tool 166, and the reader 124 takes the form of the optical scanner 188 (FIG. 5).

FIG. 5 depicts an example of one of the plurality of workstations 150 in which the production machine 116 takes the form of the frame 184 that supports the machine tool 176, configured to perform the manufacturing operation on the structure 170, the machine-readable identifier 118 takes the form of the matrix barcode 186, coupled to the fixture-tool 172, and the reader 124 takes the form of the optical scanner 188. However, any one of the workstations 150 is not limited to this configuration or combination of components. In one or more examples, the production machine 116 takes the form of the robot 178 (FIG. 4) that supports the machine tool 176, configured to perform the manufacturing operation on the structure 170. In one or more examples, the machine-readable identifier 118 takes the form of the radio-frequency identification tag 190 (FIG. 4), coupled to the fixture-tool 172, and the reader 124 takes the form of the radio-frequency identification reader 192 (FIG. 4).

Referring to FIGS. 4 and 5, in one or more examples, the material handling device 156 includes a mobile platform 160. The mobile platform 160 is configured to support the tool 120, such as the mandrel-tool 166 (FIG. 4) or the fixture-tool 172 (FIG. 5). The mobile platform 160 is also configured to move the tool 120, and the part 110 supported by the tool 120, from one workstation 150 to another workstation 150 along the continuous process flow path 152. The mobile platform 160 is further configured to react to forces applied by the production machine 116 during performance of the manufacturing operation.

In an example, the mobile platform 160 includes, or takes the form of, an automated guided vehicle (AGV). In this example, the mobile platform 160 is configured to autonomously move along continuous process flow path 152 (e.g., a predefined travel path associated with the continuous-flow process or the pulse-flow process) under computer control. For example, the system 102 includes one or more of tracks, sensors, guide tape, guide wires, laser targets, and any other suitable navigation mechanisms running through the plurality of workstations 150 for guiding the mobile platform 160 along the continuous process flow path 152.

In another example, the mobile platform 160 includes, or takes the form of, a cart. In this example, the cart is configured to be moved manually along the continuous process flow path 152 (e.g., the predefined travel path associated with the continuous-flow process or the pulse-flow process), such as by an operator or by use of a forklift. For example, the system 102 includes tracks running through the plurality of workstations 150 for guiding the mobile platform 160 along the continuous process flow path 152.

Other examples and configurations of the material handling device 156 are also contemplated. For example, the material handling device 156 may include, or take the form of, an overhead rail device that runs through the plurality of workstations 150 and the tool 120 is coupled to and is supported by the overhead rail device for guiding the tool 120 along the continuous process flow path 152.

Referring again to FIGS. 1 and 4-6, in one or more examples, the system 102 includes the computing device 126. The computing device 126 includes at least one processor 128 that is coupled to memory 130. In one or more examples, the computing device 126 forms a part of the apparatus 100 for controlling the system 102. In an example, the computing device 126 is in communication with the production machine 116 and the reader 124.

The computing device 126 is configured to retrieve process-data 106 associated with a corresponding workstation 150 or manufacturing stage 132 upon the tool 120 and the part 110 being moved to the workstation 150, such as by the material handling device 156, and prior to performing the manufacturing operation associated with the corresponding workstation 150 or manufacturing stage 132. The process-data 106 is associated with the tool-identification 122 (FIG. 6) and the corresponding workstation 150 or manufacturing stage 132. The computing device 126 is configured to update the process-data 106, subsequent to performing the manufacturing operation associated with the corresponding workstation 150 or manufacturing stages 132.

In one or more examples, the process-data 106 includes information related to the tool 120, information related to the part 110, information related to the workstation 150, information related to the manufacturing operation or work process associated with each one of the workstations 150 or manufacturing stages 132, and any other appropriate or desirable process-related information.

Referring still to FIGS. 1, 4 and 5, in one or more examples, the system 102 includes a plurality of indexing devices 158 (generally identified herein collectively as indexing devices 158 and individually as indexing device 158). Each one of the plurality of workstations 150 includes at least one indexing device 158. In FIG. 1, examples of the plurality of indexing devices 158 are identified individually as indexing device 158-1, indexing device 158-2, and indexing device 158-*n*.

The indexing device 158 is configured to locate the tool 120, for example, upon the tool 120 and the part 110 being moved within a work envelop of the workstation 150. In one or more examples, the computing device 126 is in communication with the indexing device 158 and is configured to determine a tool-location 148 (FIG. 6) of the tool 120 from location-data generated by the indexing device 158. As used herein, the term "tool-location" refers to the immediate, actual location of the tool 120 relative to a predetermined reference frame.

In one or more examples, the computing device 126 is in communication with the production machine 116 and is configured to index the production machine 116 relative to the tool 120 or relative to the part 110. Whether the production machine 116 is indexed relative to the tool 120 or to the part 110 may depend, for example, on the type of part or the manufacturing operation being performed on the part.

The indexing device 158 includes, or takes the form of, any suitable indexing equipment that is configured to determine a location of the tool 120 and/or a location of the part 110. The production machine 116 is indexed based on the determined location by any one of various techniques. In one or more examples, the indexing device 158 includes at least one probe 196 (FIGS. 4 and 5) that is configured to interface with the tool 120 and locate the tool 120 relative to a predetermined reference frame.

In one or more examples, the probe 196 is a contact probe. In an example, the probe 196 is configured to physically contact at least one of the tool 120 and/or the part 110 at a plurality of different probe locations on the tool 120 and/or the part 110. The indexing device 158 is configured to generate location-data that represents a three-dimensional characterization of an XYZ-coordinate on a surface of the tool 120 or a surface of the part 110 that corresponds to a point of contact between the probe 196 and the tool 120 or the part 110 at each probe location. The computing device 126 is configured to determine the tool-location 148 (FIG. 6) based on the probed locations on the tool 120 and/or the part 110 represented by the location-data. The production machine 116 is aligned, or "zeroed," relative to the determined tool-location 148.

In one or more examples, the probe 196 is the contact probe and is configured to physically contact an indexing feature 194 (FIGS. 4 and 5) that is located on the tool 120. The indexing device 158 is configured to generate location-data that represents an XYZ-coordinate of the tool 120 that corresponds to a point of contact between the probe 196 and the indexing feature 194. The computing device 126 is configured to determine the immediate, actual location of the tool 120 based on the probed location of the indexing feature 194 represented by the location-data. In an example, the tool 120 includes at least three indexing features 194 and the indexing device 158 includes at least three probes 196 corresponding to the indexing features 194. The production machine 116 is aligned, or "zeroed," relative to the determined tool-location 148.

In one or more examples, the probe 196 is a non-contact probe. In an example, the probe 196 is configured to scan the tool 120 and/or the part 110. In these examples, the probe 196 is any one of a two-dimensional laser scanner, a three-dimensional laser scanner, a profilometer, or other suitable machine vision system. The indexing device 158 is configured to generate location-data that represents XYZ-coordinates on a surface of the tool 120 or a surface of the part 110 that is scanned. The computing device 126 is configured to determine the tool-location 148 (FIG. 6) based on the surface profile of the tool 120 and/or the part 110 represented by the location-data. The production machine 116 is aligned, or "zeroed," relative to the determined tool-location 148.

In one or more examples, the probe 196 is the non-contact probe and is configured to scan the indexing feature 194 (FIGS. 4 and 5) that is located on the tool 120. The indexing device 158 is configured to generate location-data that represents XYZ-coordinates of the indexing feature 194. The computing device 126 is configured to determine the tool-location 148 (FIG. 6) based on the surface profile of the indexing feature 194 represented by the location-data. The production machine 116 is aligned, or "zeroed," relative to the determined tool-location 148.

In one or more examples, the computing device 126 is configured to use a tool-geometry 146 of the tool 120 to determine the tool-location 148. In these examples, an actual geometry of the tool 120 and/or an actual geometry of the indexing feature 194 are known. For example, the geometry of the tool 120 and/or the geometry of the indexing feature 194 (referred to herein as the tool-geometry 146) are represented by or are extracted from a digital model or other point cloud data. In an example, the location-data generated by the indexing device 158 represents a geometry of a portion of the tool 120 or a geometry of the indexing feature 194 at XYZ-coordinates located by the probe 196. The computing device 126 is configured to register a geometric representation of the tool 120 with a corresponding geometric representation of the portion of the tool 120 or the indexing feature 194 at the determined XYZ-coordinates, thereby locating the tool 120 for indexing purposes. Registration of the geometric representation of the tool 120 with the corresponding geometric representation of the portion of the tool 120 or the indexing feature 194 may be performed using any one of a variety of data computing techniques that best aligns a set of data points (e.g., representing the geometry of the tool 120) with a set of reference data points (e.g., representing the geometry and location of the probed portion of the tool 120), such as point cloud transformation.

In one or more examples, a location of the part 110 relative to the tool 120 is known and is fixed. Additionally, in one or more examples, a geometry of the part 110 is known. In an example, the part 110 is scanned, such as by a machine vision system or other laser metrology system, such that an actual geometry of the part 110 is determined at any one of the workstations 150 or at any location along the production line of the system 102. In another example, the geometry of the part 110, at any one of the workstations 150 or at any location along the production line of the system 102, is based on a model that represents a theoretical, or design, geometry of the part 110. In these examples, the location of part 110 is determined based on a part-geometry and a part-location relative to the tool-geometry 146 and the tool-location 148. For example, the computing device 126 is configured to register a geometric representation of the part 110 with a geometric representation of the tool 120 at a determined tool-location 148, thereby locating the part 110 for indexing purposes.

Figure 7:
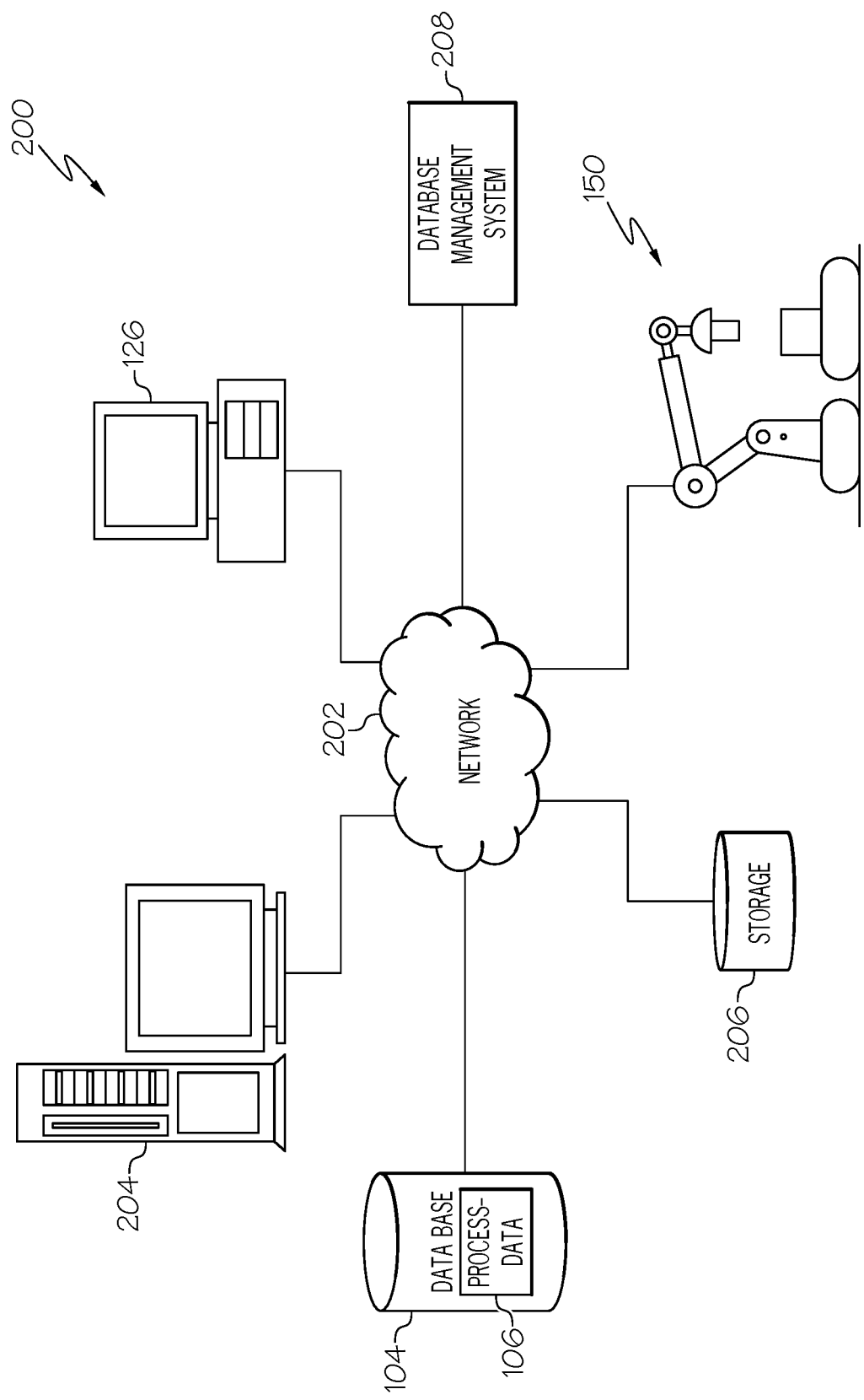
FIG. 7 is a schematic illustration of an example of a data-processing system of the continuous flow manufacturing system.

FIG. 7 schematically illustrates an example of a data-processing system 200. The data-processing system 200 forms a part of the system 102 and/or the apparatus 100 (FIG. 1). The data-processing system 200 facilitates communication of the process-data 106 (FIG. 1) throughout the system 102 (FIG. 1), for example, as controlled by the apparatus 100 (FIG. 1). In an example, the data-processing system 200 includes a network 202, which is a medium used to provide communications links between the various devices and components of the system 102 and the apparatus 100. In an example, the network 202 includes connections, such as wired communication links and wireless communication links.

In one or more examples, a server 204 and a storage unit 206 connect to the network 202. Additionally, the computing device 126 connects to the network 202. In one or more examples, each one of the workstations 150 connects to the network 202 or one or more components of the workstation 150 (e.g., the production machine 116, the reader 124, the indexing device 158, etc.) (FIG. 1) connects to the network 202. In one or more examples, the computing device 126 and/or the server 204 are in communication with the production machine 116, the reader 124, and the indexing device 158 of each workstation 150. In one or more examples, the computing device 126 and/or the server 204 are in communication with a database 104.

In one or more examples, the server 204 provides data, such as boot files, operating system files, and applications to the computing device 126 and/or components of the workstation 150. In these examples, the computing device 126 and/or the workstations 150 are clients to the server 204. The data-processing system 200 may include additional servers, clients, and other devices not shown in FIG. 4.

In one or more examples, the database 104 is stored on the storage unit 206. In an example, the storage unit 206 is memory for storing data for access by an application program being executed on a data-processing system 200, such as a database management system 208. The database 104 is managed by at least one of the server 204 and the computing device 126.

The database 104 includes, or contains, the process-data 106. In an example, the server 204 and/or the computing device 126 are capable of reading and writing to the database 104, for example, to retrieve and update the process-data 106, such as by use of a database management system 208.

The database 104 is a collection of data that is in a form that is readily manageable and accessible by a software application executed on the data-processing system, 200 such as the database management system 208. In an example, the database management system 208 is software designed to perform various operations on the database 104, such as, for example, when executed by a processor of the computing device 126 and/or the server 204. For example, the database management system 208 is used to create the database 104, add process-data 106 to the database 104, and update the process-data 106 within the database 104.

The present disclosure recognizes the need to identify the part 110 and the corresponding workstation 150, performing a manufacturing operation on the part 110, and to track the tool 120, supporting the part 110, through the system 102 (e.g., at each one of the plurality of workstations 150) as the tool 120 travels along the continuous process flow path 152. The system 102 and the apparatus 100 manage the continuous manufacturing process by identifying the tool 120 at the corresponding workstation 150, associating the tool 120 with a corresponding part 110, supported by the tool 120, associating the tool 120 with the corresponding workstation 150, and associating the work process, being performed on the part 110, with the corresponding workstation 150.

Referring again to FIGS. 1-5, each workstation 150 is configured to perform one or more types of manufacturing operations on the part 110, for example, based on the structure of the part, the material composition of the part, the work process being performed on the part, and the like. For example, the production machine 116 associated with the workstation 150 is configured to perform one or more manufacturing operations corresponding to the work process of a particular manufacturing stage 132 of the continuous manufacturing process and a particular type of part 110.

The system 102, for example, under control of the apparatus 100 (FIG. 1), can produce any number of parts 110, can perform any number of different work processes on the part 110, and can perform work on various types of parts 110. In one or more examples, the system 102 (e.g., the plurality of workstations 150) is configured to perform a similar type of work process on a similar type of part 110, such as composite lamination operation on a pre-cure composite laminate. In one or more examples, the type of work process and/or the type of part 110 change as the part 110 moves between the various workstations 150 of the system 102. For example, a first portion of the system 102 (e.g., a first one of the workstations 150) is configured to perform a composite layup operation on a pre-cure composite laminate, a second portion of the system 102 (e.g., a second one of the workstations 150) is configured to perform a composite processing operation (e.g., debulking or curing) on the pre-cure composite laminate, and a third portion of the system 102 (e.g., a third one of the workstations 150) is configured to perform a machining or assembly operation on a post-cure composite structure.

Referring to FIG. 1, in one or more examples, the system 102 includes a plurality of workstation-identifications 162 (generally identified herein collectively as workstation-identifications 162 and individually as workstation-identification 162). Each workstation 150 is assigned at least one workstation-identification 162. In FIG. 1, examples of the plurality of workstation-identifications 162 are identified individually as workstation-identification 162-1, workstation-identification 162-2, and workstation-identification 162-n.

The workstation-identification 162 is unique to the workstation 150 to which it is associated. The system 102 and apparatus 100 are configured to associate the tool-identification 122 of the tool 120, corresponding to the part 110 supported by the tool 120, with the workstation-identification 162 of the corresponding workstation 150 performing work on the part 110. In other words, each workstation 150 of the system 102 includes a corresponding workstation-identification 162 and is capable of being uniquely identified. Reading the machine-readable identifier 118 associated with the tool 120 by the reader 124 associated with the workstation 150 thereby associates the part 110 with the corresponding manufacturing operation or work process performed at the workstation 150.

In one or more examples, the workstation-identification 162 includes, or takes the form of, a number, alphanumeric code, or other unique identification data associated with the workstation 150. As will be described in more detail herein, in one or more examples, the workstation-identification 162 is associated with various other information about the manufacturing operation or work process performed on the part 110 to which it is associated.

Referring to FIGS. 4-6, the tool 120 is uniquely configured to support a particular type of the part 110, for example, based on the structure of the part, the material composition of the part, the work process being performed on the part, and the like. As an example, one type of tool 120 is configured to support a pre-cure composite material (e.g., the pre-cure composite laminate 164) (FIG. 4) and another type of tool 120 is configured to support a post-cure composite structure or non-composite structure (e.g., the structure 170) (FIG. 5). As another example, one type of tool 120 is configured to support the part 110 during one work process (e.g., a composite lamination process) and another type of tool 120 is configured to support the part 110 during a different work process (e.g., an assembly operation).

In one or more examples, the system 102 and apparatus 100 use a plurality of tool-identifications 122 associated with a plurality of tools 120. In these examples, each tool-identification 122 is encoded on a corresponding one of a plurality of machine-readable identifiers 118 and is unique to the corresponding one of the plurality of tools 120 to which it is associated. In other words, each tool 120 includes a corresponding tool-identification 122 and is capable of being uniquely identified by reading the machine-readable identifier 118 associated with the tool 120 and determining the unique tool-identification 122 encoded thereon.

While similar types of parts 110 produced using the system 102 have similar material compositions, structures, characteristics, and functions or undergo similar work processes, each part 110 may have different attributes at different stages of the continuous manufacturing process. Accordingly, the present disclosure recognizes the need to identify and track the part 110 through the system 102 (e.g., at each one of the plurality of workstations 150) as the tool 120, supporting the part 110, travels along the continuous process flow path 152. The system 102 and the apparatus 100 manage the continuous manufacturing process by associating the part 110 with the corresponding tool 120 and associating the work process at each workstation 150 with the corresponding part 110.

In one or more examples, the part 110 is assigned a part-identification 108 (FIG. 6). The part-identification 108 is unique to the part 110 to which it is associated. The system 102 and apparatus 100 are configured to associate the part-identification 108 of the part 110 with the tool-identification 122 of the tool 120 that corresponds to and supports the part 110. In other words, each part 110 produced using the system 102 includes a corresponding part-identification 108 and is capable of being uniquely identified by reading the machine-readable identifier 118 associated with the tool 120 and determining the unique part-identification 108 associated with the corresponding tool-identification 122.

In one or more examples, the part-identification 108 includes, or takes the form of, a number, alphanumeric code, or other unique identification data associated with the part 110. In one or more examples, the part-identification 108 is also associated with various other information about the part 110 to which it is associated.

Referring back to FIGS. 4 and 5, in one or more examples, the system 102 includes a second machine-readable identifier 154. The second machine-readable identifier 154 is associated with the part 110 and is encoded with the part-identification 108. In an example, the second machine-readable identifier 154 is coupled to the part 110.

In an example, the reader 124 is configured to read the second machine-readable identifier 154. The reader 124 is configured to recognize the second machine-readable identifier 154, decode the data (e.g., the part-identification 108) stored on the second machine-readable identifier 154, and send the data to the computing device 126. The reader 124 and the second machine-readable identifier 154 facilitate management and transfer of information related to the part 110 and the various work processes performed on the part 110 as the part 110 travels along the continuous process flow path 152 between the various manufacturing stages 132 or workstations 150.

In one or more examples, the system 102 and apparatus 100 utilize the machine-readable identifier 118, associated with the tool 120, and the second machine-readable identifier 154, associated with the part 110. In one or more examples, the system 102 and apparatus 100 utilize one of the machine-readable identifier 118, associated with the tool 120, or the second machine-readable identifier 154, associated with the part 110.

While the illustrated examples of the system 102 depict one second machine-readable identifier 154 associated with the part 110, in other examples, the part 110 includes any number of second machine-readable identifiers 154.

In one or more examples, the system 102 and apparatus 100 utilize a plurality of the machine-readable identifiers 118, each associated with a corresponding tool 120, and/or a plurality of the second machine-readable identifiers 154, each associated with a corresponding part 110.

Whether the system 102 and apparatus 100 utilize both the machine-readable identifier 118 and the second machine-readable identifier 154 or utilize the plurality of machine-readable identifiers 118 and/or the plurality of machine-readable identifiers 154 may depend on various factors, such as, for example, the type of the tool 120 and/or the part 110, the size of the tool 120 and/or the part 110, the various manufacturing operations performed on the part 110, how the tool 120 and/or the part 110 are moved throughout the system 102, the type of workstation 150 and/or reader 124, and the like. For example, different portions of a large part 110, supported by a large tool 120, may be located at different workstations 150 at the same time. In this example, the plurality of machine-readable identifiers 118 and/or second machine-readable identifiers 154 are arranged such that each one is readable at each one of the workstations 150 concurrently performing work on the part 110.

Referring again to FIG. 8, in one or more examples, the process-data 106, contained on the database 104, includes a plurality of elements 214. The elements 214 relate to or represent information about and/or attributes of the tool 120, the part 110, the workstations 150, the manufacturing operations performed on the part 110, and various other process-related information. For example, the process-data 106 includes a plurality of elements 214.

In an example, one or more of the elements 214 of the process-data 106 includes information related to the tool 120. In an example of the process-data 106, one of the elements 214 includes the tool-identification 122. In an example of the process-data 106, one of the elements 214 includes the tool-geometry 146, corresponding to the tool 120 associated with the tool-identification 122. In an example of the process-data 106, one of the elements 214 includes the tool-location 148 of the tool 120, determined using the indexing device 158.

In one or more examples, process-data 106 includes elements 214 relating to at least one of the tool-identification 122, the tool-geometry 146, and the tool-location 148 corresponding to each one of the plurality of tools 120 used with the system 102.

In one or more examples of the process-data 106, one or more of the elements 214 includes information related to the part 110. In an example of the process-data 106, one of the elements 214 includes the part-identification 108, corresponding to the part 110. In an example of the process-data 106, one of the elements 214 includes a part-geometry 136, corresponding to the part 110 associated with the part-identification 108.

In one or more examples, the process-data 106 includes elements 214 relating to at least one of the part-identification 108 and the part-geometry 136, corresponding to each one of a plurality of parts 110 produced using the system 102.

In an example, the part-geometry 136 is the theoretical, or design, geometry of the part 110. In this example, the part-geometry 136 is generated or loaded for the part 110, for example, before and/or after performance of a corresponding manufacturing operation.

In another example, the part-geometry 136 is the actual geometry of the part 110. In this example, the part-geometry 136 is measured or is otherwise determined for the part 110, for example, before and/or after performance of a corresponding manufacturing operation.

In one or more examples of the process-data 106, one or more of the elements 214 includes information related to the manufacturing operation or work process performed on the part 110 at a given workstation 150 or manufacturing stage 132 of the continuous manufacturing process. In an example of the process-data 106, one of the elements 214 includes operating instructions 114 for the production machine 116, configured to perform the manufacturing operation associated with a particular workstation 150 or manufacturing stage 132. For example, the operating instructions 114 includes numerical control program instructions to be executed by the production machine 116 in performing the manufacturing operation on the part 110.

In one or more examples of the process-data 106, one or more of the elements 214 includes operation-information 138 that represents other characteristics or attributes of the manufacturing operation performed on the part 110 at the corresponding workstation 150.

In an example, the operation-information 138 includes the number of plies of a composite material to be laid up at a particular workstation 150. In an example, the operation-information 138 includes a set time interval for appropriate lamination to occur at a particular workstation 150. In an example, the operation-information 138 includes an orientation of one or more layers of a composite layup. In an example, the operation-information 138 includes information related to the material inputs required to perform the manufacturing operation.

In one or more examples of the process-data 106, one or more of the elements 214 includes information related to a condition of the part 110 throughout the continuous manufacturing process. In an example of the process-data 106, one of the elements 214 includes inspection-information 140.

In an example, the inspection-information 140 represents a quality 142 of the part 110, subsequent to performing the manufacturing operation and inspection of the part 110. For example, the inspection-information 140 includes information indicating completion of the manufacturing operation, indicating that a quality assurance inspection of the part 110 has been performed following the manufacturing operation at the corresponding workstation 150, and/or that the part 110 has been approved to move to a subsequent workstation 150 for performance of a subsequent manufacturing operation (e.g., "buy-off" of the part 110 at each workstation 150).

In an example, the inspection-information 140 represents a non-conformance 144 of the part 110, subsequent to performing the manufacturing operation and inspection of the part 110. In an example, the inspection-information 140 represents the non-conformance 144 of the part 110, subsequent to a correction of the non-conformance (e.g., a corrective action performed on the part 110 or rework of the part 110). In one or more examples, the non-conformance 144 includes any non-conforming aspect or characteristic of the part 110 following the manufacturing operation. In an example, the non-conformance 144 includes an element of the part 110 that is not within a predetermines manufacturing tolerance. In another example, the non-conformance 144 includes a gap between adjacent elements of a composite layup.

Figure 9:
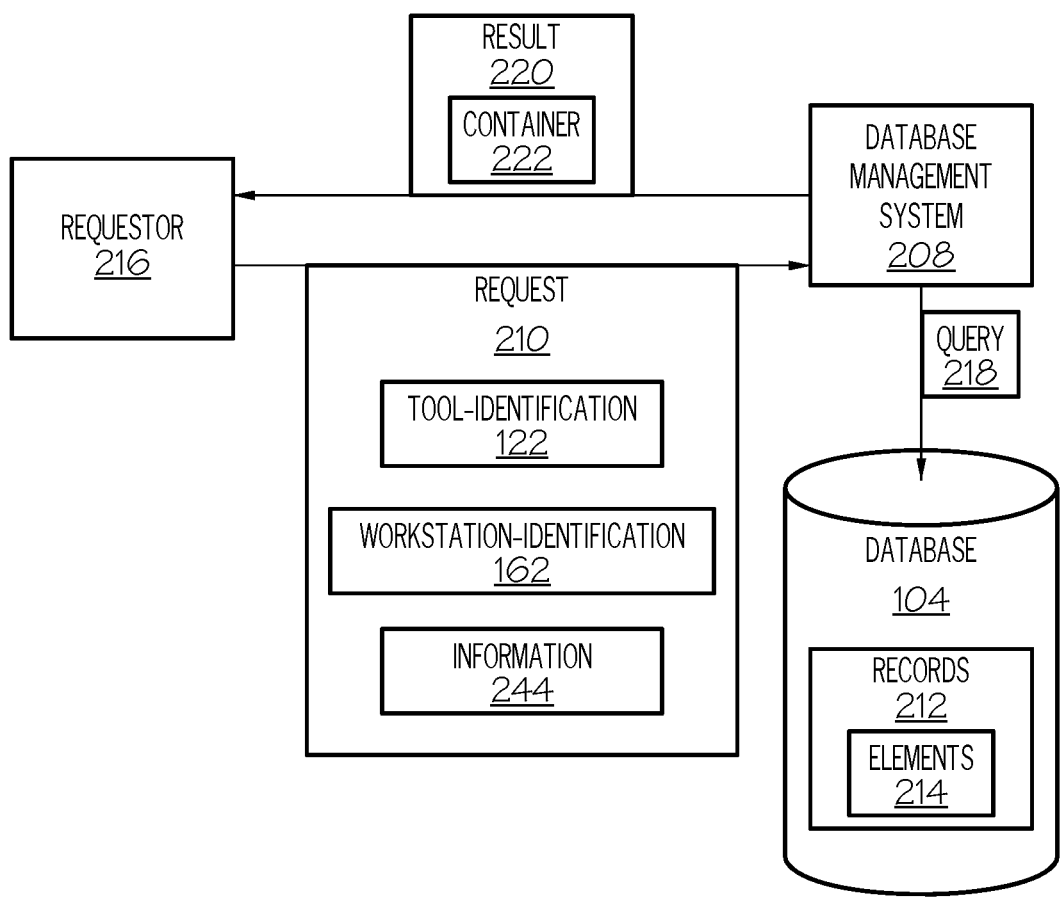
FIG. 9 is a schematic block diagram of an example of database management of the continuous flow manufacturing system.

Referring to FIG. 9, in one or more examples, the database management system 208 is part of an information system database. In an example, the database management system 208 is a software program, application, or component executed by the computing device 126 of the apparatus 100 of the system 102, such as the processor 128 (FIG. 1).

In an example, the database management system 208 receives a request 210. In an example, the request 210 is a request to retrieve a set of elements 214 within the database 104. For example, the set of elements 214 includes one or more elements 214 of the process-data 106 (FIG. 5). In another example, the request 210 is a request to update the set of elements 214 within the database 104. For example, the set of elements 214 includes one or more elements 214 of the process-data 106. In another example, the request 210 is a request to add one or more elements 214 to the database 104. For example, one or more elements 214 are added to the process-data 106.

In various examples, the elements 214 of the process-data 106 are stored, sorted, or arranged in the records 212 within the database 104. In these examples, one or more of the records 212 correspond to any of the process-related information associated with the tool 120, the part 110, the workstations 150, and the like.

In one or more examples, the request 210 includes, or contains, the tool-identification 122 and/or the workstation-identification 162. The tool-identification 122 and the workstation-identification 162 are used to identify an element 214 or set of elements 214 contained in the database 104. For example, the tool-identification 122 and the workstation-identification 162 are used in determining which elements 214 within the record 212 or which record 212 of the records 212 should be retrieved from the database 104. In this way, the tool-identification 122 and the workstation-identification 162 provide a unique way to identify each element 214 or each record 212 within the database 104.

In one or more examples, a requestor 216 sends a query 218 to the database management system 208 to obtain information from the database 104. In response to the query 218, the database management system 208 uses the request 210 to determine one or more elements 214 of the process-data 106 or one or more records 212 associated with the tool-identification 122 and the workstation-identification 162. The one or more elements 214 are retrieved and returned in a result 220 by the database management system 208 to the requestor 216. For example, the result 220 includes a logical container 222 that includes the elements 214 retrieved in response to the query 218 or references to those elements 214.

In an example, the requestor 216 is a software program, application, or component, for example, executed by the computing device 126 of the apparatus 100 of the system 102. In one or more examples, the query 218 is initiated by reading the machine-readable identifier 118 (FIGS. 1, 4 and 5) corresponding to the tool 120, supporting the part 110, when the tool 120 is moved into the workstation 150. In one or more examples, the query 218 is initiated by reading the second machine-readable identifier 118 (FIGS. 4 and 5) corresponding to the part 110, when the part 110 is moved into the workstation 150.

In one or more examples, the request 210 also includes, or contains, information 244. The information 244 includes one or more additional elements 214 and/or an update to one or more of the elements 214. In one or more examples, the tool-identification 122 and/or the workstation-identification 162 are used in determining which elements 214 within the record 212 or which record 212 of the records 212 should be updated with the information 244. In this way, the tool-identification 122, the workstation-identification 162, and the information 244 provide a unique way to identify and update each element 214 or each record 212 within the database 104.

In one or more examples, the workstation-identification 162 (FIGS. 1 and 8) contains the information needed to identify the workstation 150 associated with the information 244. The tool-identification 122 (FIGS. 6 and 8) contains the information needed to identify the tool 120 and/or the part 110 associated with the information 244. By identifying the appropriate elements 214 and/or records 212 associated with the part 110, the tool 120, and the workstation 150, one or more of the elements 214 may be updated with the information 244, as the part 110 moves through the system 102 (FIG. 1).

Figure 8:
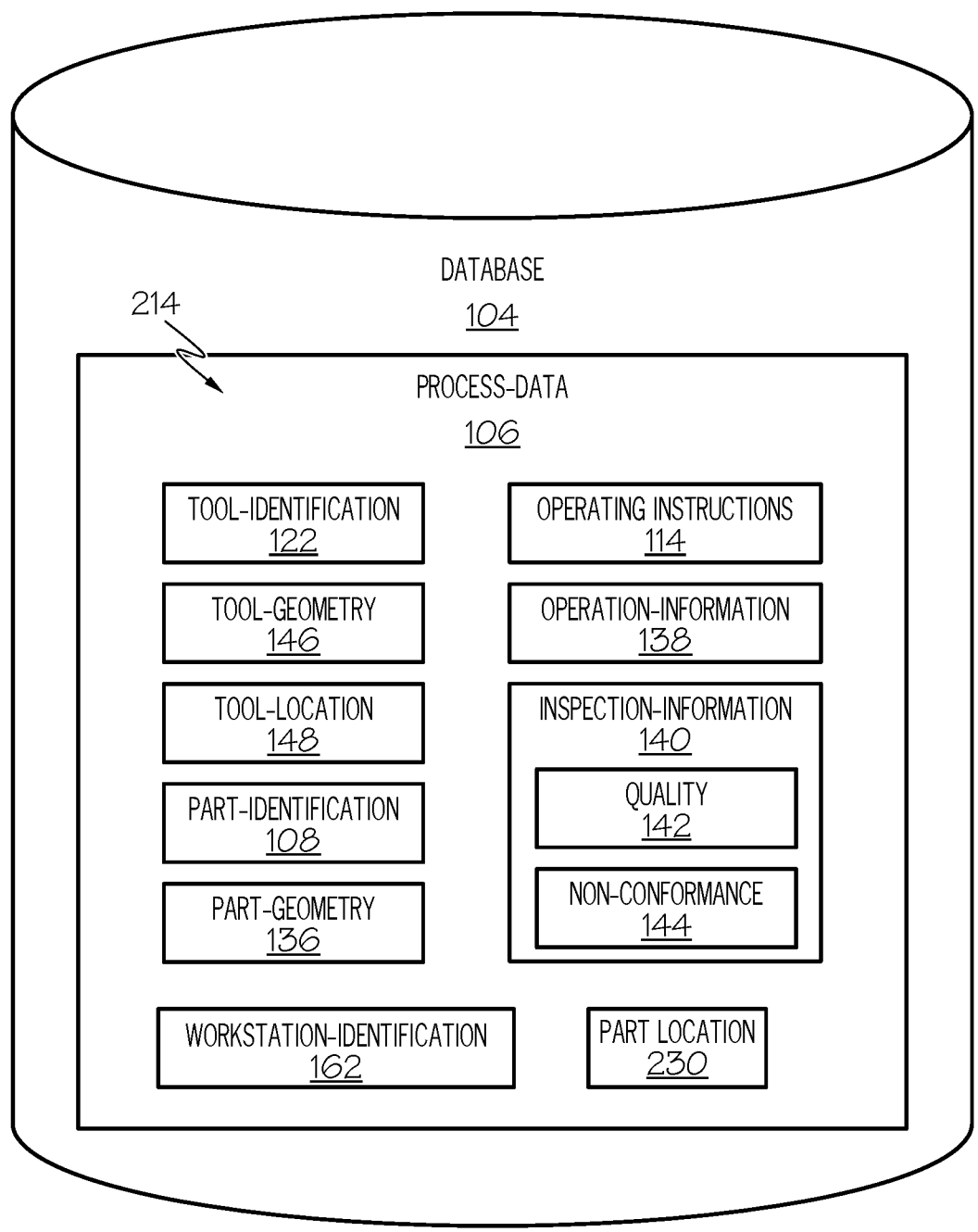
FIG. 8 is a schematic block diagram of an example of a database containing process-data for the continuous flow manufacturing system.

Referring to FIGS. 1, 6, 8 and 9, in one or more examples, the information 244 (FIG. 9) includes the inspection-information 140 (FIG. 8) associated with the part 110 (FIGS. 1 and 6). In one or more examples, the information 244 includes the tool-location 148 (FIGS. 6 and 8). In one or more examples, the information 244 includes the part-geometry 136 (FIG. 8). In one or more examples, the information 244 includes the operation-information 138 (FIG. 8).

In this manner, the database 104 may be created with or modified to include any the process-data 106 and other process-related information represented by a set of elements 214. In one or more examples, the elements 214 have an operational relationship with the corresponding part 110 and/or the corresponding workstation 150 and the records 212 are associated with corresponding parts 110 and corresponding workstations 150.

Figure 10:
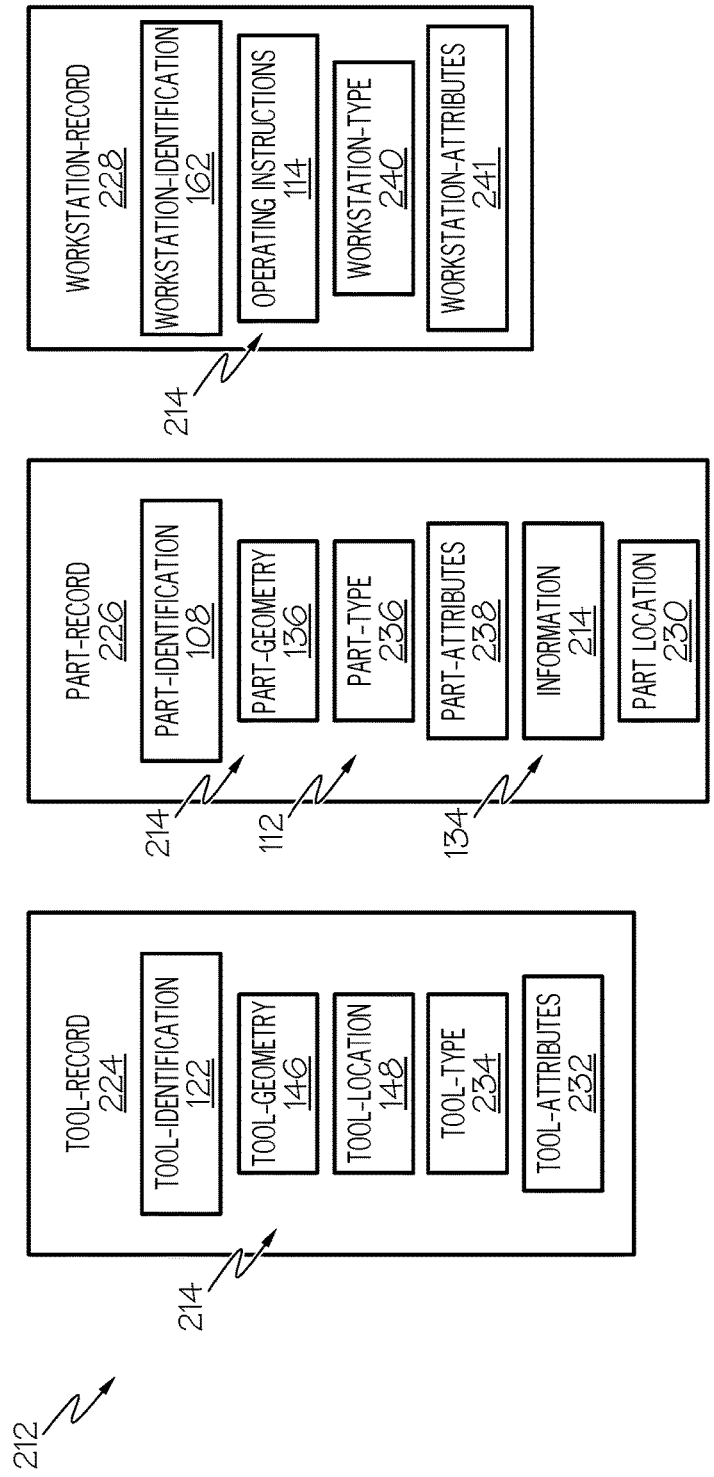
FIG. 10 is a schematic block diagram of an example of records containing elements of the process-data.

Referring to FIG. 10, in one or more example, each one of the records 212 includes one or more of the elements 214 and corresponds to at least one of the tool 120, the part 110, and the workstation 150. In the illustrated examples, the records 212 include a tool-record 224, a part-record 226, and a workstation-record 228. In other examples, the elements 214 of the process-data 106 (FIG. 8) may be organized in additional or different records.

In an example, the tool-record 224 includes the tool-identification 122, the tool-geometry 146, the tool-location 148, a tool-type 234, and tool-attributes 232. In an example, the tool-type 234 includes the name, designation, or feature type of the tool 120, such as the mandrel-tool 166 (FIG. 4) or the fixture-tool 172 (FIG. 5). In an example, the tool-attributes 232 includes other information or characteristics related to the tool 120.

In an example, the part-record 226 includes the part-identification 108, the part-geometry 136, a part-type 236, and part-attributes 238. In an example, the part-type 236 includes the name, designation, or feature type of the part 110, such as the pre-cure composite laminate 164 (FIG. 4) or the structure 170 (FIG. 5). In an example, the part-attributes 238 includes other information or characteristics related to the part 110, such as the operation-information 138. In one or more examples, the part-record 226 also includes the information 244 used to update one or more of the elements 214 or to add one or more additional elements 214, such as the inspection-information 140 or an updated, actual representation of the part-geometry 136.

In an example, the workstation-record 228 includes the workstation-identification 162, the operating instructions 114, a workstation-type 240, and workstation-attributes 241. In an example, the workstation-type 240 includes the name, designation, or feature type of the workstation, the work process, the type of production machine 116, and the like. In an example, the workstation-attributes 241 includes other information or characteristics related to the workstation 150, such as the operation-information 138.

In this manner, when queries 218 (FIG. 9) are made in respond to requests 210 (FIG. 9), any of the records 212 and/or elements 214 can be identified through identifying the tool 120, the part 110, and/or the workstation 150. Elements 214 can also be sorted by associating one or more elements 214 with the identification corresponding to the tool 120, the part 110, and/or the workstation 150. For example, if multiple elements 214 or types of elements 214 are present for a work process, then the identification may be used to sort the records 212.

Accordingly, the elements 214 of the process-data 106 may include any information related to the work processes performed by the system 102 and one or more of the elements 214 may be subject to change, such as by updating the elements 214 with the information 244 submitted with the request 210. In one or more examples, the process-data 106, such as the part-record 226, includes a pre-operation condition 112 of the part 110, such as prior to performing the manufacturing operation corresponding to a particular workstation 150. In one or more examples, the process-data 106, such as the part-record 226, includes a post-operation condition 134 of the part 110, such as subsequent to performing the manufacturing operation corresponding to a particular workstation 150.

In one or more examples, the pre-operation condition 112 of the part 110 includes the part-geometry 136 of the part 110, prior to performing the manufacturing operation. In one or more examples, the pre-operation condition 112 of the part 110 includes the operation-information 138 representing a preceding manufacturing operation performed on the part 110.

In one or more examples, the post-operation condition 134 of the part 110 includes the part-geometry 136 of the part 110, subsequent to performing the manufacturing operation. In one or more examples, the post-operation condition 134 of the part 110 includes the operation-information 138 representing the manufacturing operation performed on the part 110. In one or more examples, the post-operation condition 134 of the part 110 includes inspection-information 140 representing the quality 142 (FIG. 8) of the part 110, subsequent to performing the manufacturing operation and inspection of the part 110. In one or more examples, the post-operation condition 134 of the part 110 includes the inspection-information representing the non-conformance 144 (FIG. 8) of the part 110, subsequent to performing the manufacturing operation and inspection of the part 110 or subsequent to a correction of the non-conformance 144.

Figure 11:
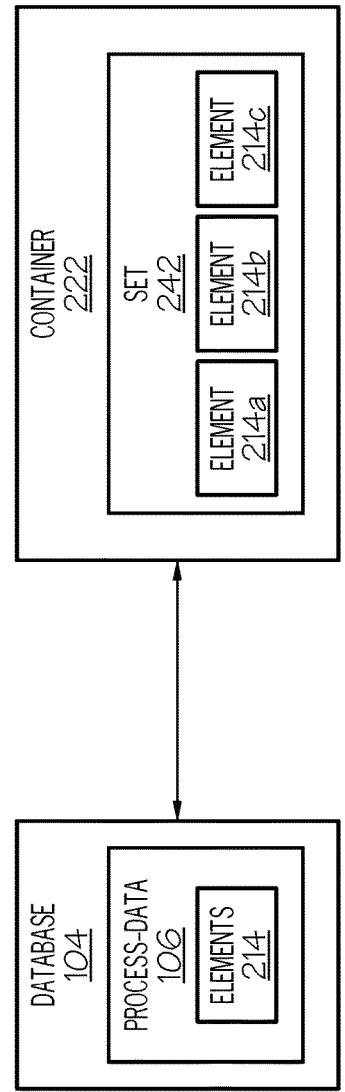
FIG. 11 is a schematic block diagram of an example of a logical container used in database management of the continuous flow manufacturing system.

Referring to FIG. 11, in one or more examples, the result 220 provided by the database management system 208 (FIG. 9) includes logical container 222. In an example, the container 222 includes one or more elements 214 or references (e.g., pointers) to one or more elements 214 within the database 104 (FIG. 9). In another example, the container 222 includes one or more records 212 within the database 104. In other examples, the result 220 may include other logical containers or additional logical containers.

In one or more examples, the container 222 is made up of a set 242 of the elements 214 (FIGS. 8-10) that correspond to the part 110 (FIGS. 1-6) at a corresponding one of the workstations 150 (FIGS. 1-5) for performing the manufacturing operation on the part 110. For example, the set 242 is a grouping of elements 214, such as elements 214a, 214b, and 214c, or references to the elements 214a, 214b, and 214c, associated with the tool-identification 122, the part-identification 108, and the workstation-identification 162 (FIGS. 8 and 10) at a particular manufacturing stage 132 (FIG. 1) of the continuous manufacturing process. In this manner, the set 242 of elements 214 have a logical relationship with each other and the work process being performed on the part 110 as the part 110 moves through the system 102.

Accordingly, the system 102 and apparatus 100 are configured to identify the tool 120 using the tool-identification 122 and to associate the tool-identification 122 with the process-data 106, corresponding to the pre-operation condition 112 of the part 110 and the workstation 150. The system 102 and apparatus 100 are further configured to index the production machine 116 relative to the tool 120 or the part 110 and to control operation of the production machine 116 to perform the manufacturing operation on the part 110. The processor 128 is also configured to update the process-data 106 to further include the post-operation condition 134 of the part 110, subsequent to performing the manufacturing operation.

In this manner, the system 102 and apparatus 100 track and control the flow of work processes associated with each one of the manufacturing stages 132, such as the flow of inputs and outputs associated with each one of the workstations 150 of the system 102. The system 102 and apparatus 100 use detection of the machine-readable identifier 118 to perform various steps in managing the flow of the process-data 106 within the continuous manufacturing process to increase the accuracy and efficiency of production and/or the quality of production of the process and to reduce the cycle time of the process and/or the costs associated with errors within the process.

Figure 12:
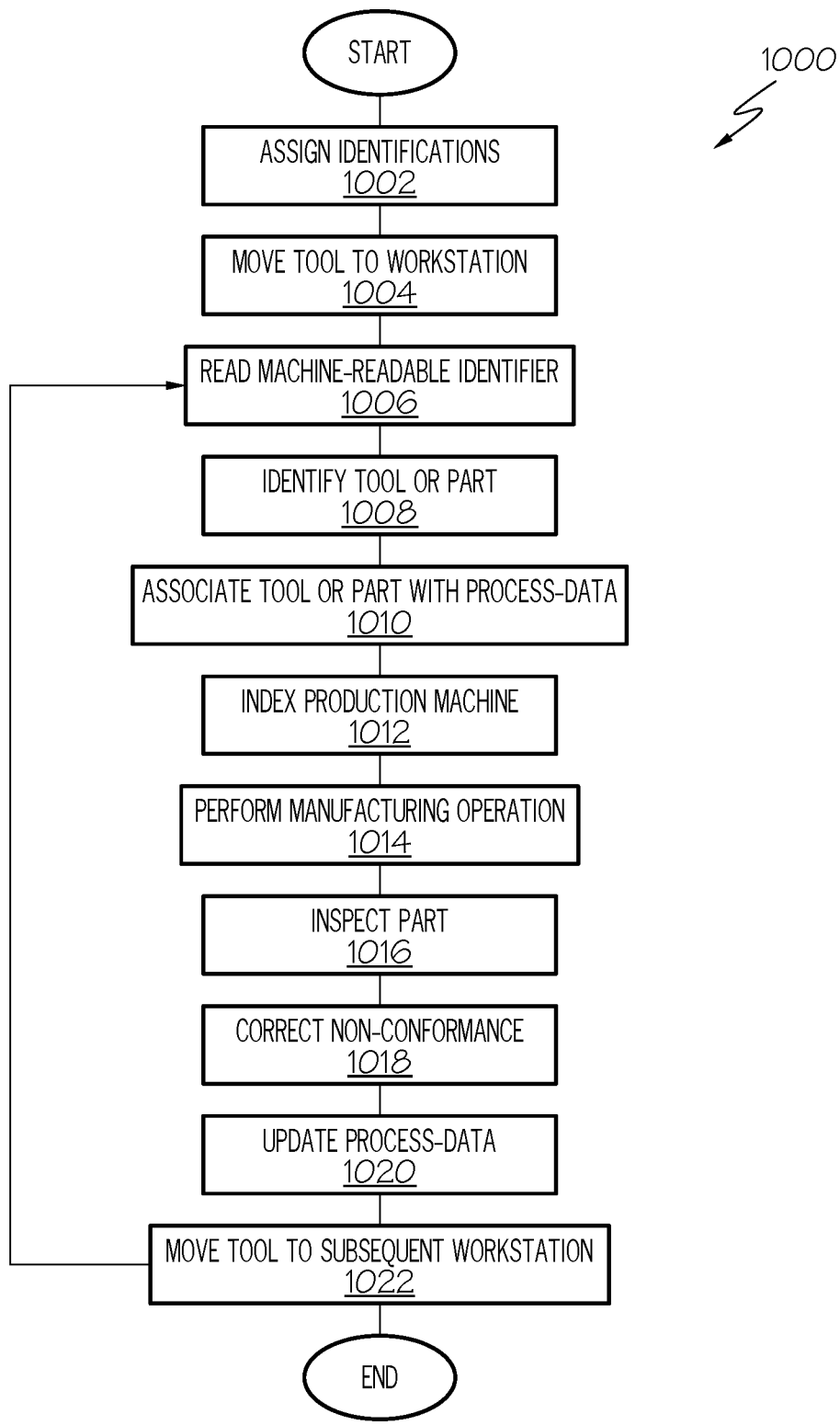
FIG. 12 is a flow diagram of an example of a method for controlling a continuous flow manufacturing system.

Referring generally to FIG. 12, by way of examples, the present disclosure is also directed to a method 1000 of controlling the continuous flow manufacturing system 102 (FIG. 1). In one or more examples, implementation of the method 1000 is performed by the apparatus 100 (FIG. 1).

Implementation of the operations steps of the method 1000 disclosed herein performs process management by documenting, tracking, and recording process-related information at each stage of a continuous manufacturing process. Implementation of the method 1000 updates the process-related information by tracking movement of a manufactured part from stage to stage throughout the continuous manufacturing process. Implementation of the method 1000 also direct production by determining the required inputs, the required work processes, and the generated outputs at each stage of the continuous manufacturing process.

The method 1000 disclosed herein facilitates communication between the various manufacturing stages of the process by maintaining process-related information throughout the continuous manufacturing process. The method 1000 disclosed herein facilitates continuous flow manufacturing of large parts by identifying and accurately locating non-fixed-base tooling throughout the continuous manufacturing process. The method 1000 disclosed herein facilitates continuous flow manufacturing of composite parts by updating and carrying the process-related information through the continuous manufacturing process.

In one or more examples, the method 1000 includes a step of (block 1002) assigning identifications. In an example, the tool-identification 122 is assigned to the tool 120. For example, a unique one of a plurality of tool-identifications 122 is assigned to each one of a plurality of tools 120 used with the system 102. In an example, the part-identification 108 is assigned to the part 110. For example, a unique one of a plurality of part-identifications 108 is assigned to each one of a plurality of parts 110 produced using the system 102. In an example, the workstation-identification 162 is assigned to the workstation 150. For example, a unique one of a plurality of workstation-identifications 162 is assigned to each one of a plurality of workstation 150 forming the production line of the system 102.

In one or more examples, the method 1000 includes a step of (block 1004) moving a tool to a workstation. In an example, the tool 120, holding the part 110, is moved to the workstation 150 using the material handling device 156.

In one or more examples, the method 1000 includes a step of (block 1006) reading a machine-readable identifier. In an example, the machine-readable identifier 118 is read by the reader 124 associated with the workstation 150 when the tool 120 and the part 110 are moved to the workstation 150 and prior to performing the manufacturing operation on the part 110. In another example, the second machine-readable identifier 154 is read by the reader 124 associated with the workstation 150 when the part 110 is moved to the workstation 150 and prior to performing the manufacturing operation on the part 110. In yet another example, the machine-readable identifier 118 and the second machine-readable identifier 154 are read by the reader 124 associated with the workstation 150 when the tool 120 and/or the part 110 are moved to the workstation 150.

In one or more examples, the method 1000 includes a step of (block 1008) identifying the tool or a part. In an example, the tool 120 and/or the part 110 is identified at the workstation 150 that implements at least one manufacturing operation performed on the part 110. In an example, the tool 120 is identified using the tool-identification 122 associated with the tool 120 and encoded on the machine-readable identifier 118. In an example, the part 110 is identified by associating the part-identification 108 with the corresponding tool-identification 122 associated with the tool 120, holding the part 110. In another example, the part 110 is identified using the part-identification 108 associated with the part 110 and encoded on the second machine-readable identifier 154.

In one or more examples, the method 1000 includes a step of (block 1010) associating the tool or the part with process-data. In an example, the tool-identification 122 is associated with the process-data 106 associated with the part 110 and the workstation 150 in which a work process is performed on the part 110. In another example, the part-identification 108 is associated with the process-data 106 associated with the part 110 and the workstation 150 in which a work process is performed on the part 110.

Generally, at this point of the method 1000, the process-data 106 includes or represents the pre-operation condition 112 of the part 110 prior to performing the manufacturing operation on the part 110. In an example, the step of (block 1010) associating the tool 120 and/or the part 110 with the process-data 106 is performed by, or includes a step of, retrieving the set 242 of the elements 214 from the database 104 that is associated with at least one of the tool-identification 122, the part-identification 108, and the workstation-identification 162 in response to the request 210 made to the database management system 208. In an example, the elements 214 of the process-data 106 reflect the pre-operation condition 112 of the part 110.

In an example, the step of (block 1010) associating the tool 120 and/or the part 110 with the process-data 106 is performed in response to the step of (block 1006) reading the machine-readable identifier 118 and/or the second machine-readable identifier 154. In an example, the machine-readable identifier 118 and/or the second machine-readable identifier 154 are read using the reader 124 prior to performing the manufacturing operation on the part 110. In an example, reading the reading the machine-readable identifier 118 and/or the second machine-readable identifier 154 initiates the request 210.

In one or more examples, the method 1000 includes a step of (block 1012) indexing a production machine. In an example, the production machine 116 is indexed relative to the tool 120 or the part 110. In an example, the tool-location 148 is determined using the indexing device 158 associated with the workstation 150 and the production machine 116 associated with the workstation 150 is indexed relative to the tool-location 148. In an example, the tool-location 148 is determined using the tool-geometry 146 associated with the tool 120 and retrieved from the database 104. In another example, the part-location 230 is determined using the tool-geometry 146 and the part-geometry 136 retrieved from the database 104 and the production machine 116 associated with the workstation 150 is indexed relative to the part-location 230.

In one or more examples, the method 1000 includes a step of (block 1014) performing a manufacturing operation on the part. In an example, the step of (block 1014) performing the manufacturing operation on the part 110 is performed using, or includes a step of controlling, the production machine 116 associated with the workstation 150. In an example, the production machine 116 is controlled using the operating instructions 114 retrieved from the database 104 associated with the tool-identification 122, the part-identification 108, and the workstation-identification 162 that corresponds to the workstation 150 and the work process being performed on the part 110.

In an example, the step of (block 1014) performing the manufacturing operation on the part 110 includes a step of performing at least one of a subtractive manufacturing operation and an assembly operation on the part 110, such as the structure 170.

In an example, the step of (block 1014) performing the manufacturing operation on the part 110 includes a step of performing a pre-cure assembly operation on the part 110, such as the pre-cure composite laminate 164. For example, the step of (block 1014) performing the manufacturing operation on the part 110 includes a step of performing a lamination operation on the pre-cure composite laminate 164.

In one or more examples, the method 1000 includes a step of (block 1016) inspecting the part. In an example, the step of (block 1016) inspecting the part 110 is performed subsequent to the step of (block 1014) performing the manufacturing operation. In an example, the part 110 is inspected manually, such as by an operator, following the manufacturing operation. In another example, the part 110 is inspected automatically, such as by a machine vision inspection system, following the manufacturing operation.

In one or more examples, the method 1000 includes a step of (block 1018) correcting a non-conformance, such as subsequent to inspection. In an example, the step of (block 1016) inspecting the part 110 includes a step of determining the presence of and/or identifying the non-conformance 144 in the part 110. In an example, the non-conformance 144 is corrected manually, such as by an operator, following inspection. In another example, the non-conformance 144 is corrected automatically, such as by the production machine 116, following the inspection.

In one or more examples, the method 1000 includes a step of (block 1020) updating the process-data. In an example, the step of (block 1020) updating the process-data 106 includes updating the process-data 106 to include, or to represent, the post-operation condition 134 of the part 110. In an example, one or more elements 214 of the process-data 106 are updated to reflect the post-operation condition 134 of the part 110. In another example, one or more additional elements 214 of the process-data 106 are added to reflect the post-operation condition 134 of the part 110. In an example, the information 244 contained with the request 210 is used to update the elements 214 in the database 104 or add additional elements 214 to the database 104 associated with the part-identification 108, the tool-identification 122, and/or the workstation-identification 162.

In an example, the step of (block 1020) updating the process-data 106 includes a step of rereading the machine-readable identifier 118 and/or the second machine-readable identifier 154. In an example, the machine-readable identifier 118 and/or the second machine-readable identifier 154 are read using the reader 124 subsequent to performing the manufacturing operation on the part 110 or, optionally, subsequent to inspecting the part 110. In an example, rereading the reading the machine-readable identifier 118 and/or the second machine-readable identifier 154 initiates a subsequent request 210 that includes the information 244, representing the post-operation condition 134 of the part 110. In response to the subsequent request 210, the database management system 208 updates the process-data 106, such as by updating one or more of the elements 214 or adding additional elements 214 to the database 104.

In one or more examples, the method 1000 includes a step of (block 1022) moving the tool to a subsequent workstation. In an example, the tool 120, holding the part 110, is moved to the next one of the plurality of workstations 150 in series along the continuous process flow path 152. Upon the tool 120 and the part 110 being moved to the next workstation 150, the operations of the method 1000 are repeated to perform the next manufacturing operation on the part 110 and update the process-data 106. In this manner, the post-operation condition 134 of the part 110 subsequent to performing the previous manufacturing operation of a preceding workstation 150 becomes the pre-operation condition 112 of the part 110 prior to performing the subsequent manufacturing operation of a succeeding workstation 150.

Referring generally to FIGS. 1-12, also disclosed is a method for fabricating a portion of an aircraft 1200 (FIG. 14) using the continuous flow manufacturing system 102. Also disclosed is a method for fabricating a portion of the aircraft 1200 using the apparatus 100 for controlling the continuous flow manufacturing system 102. Also disclosed is a portion of the aircraft 1200 manufactured in accordance with the method 1000.

While one or more of the examples described herein relate to fully automated work processes, in one or more other examples, the system 102, the apparatus 100, and the method 1000 may be used with partially automated work processes or manual work processes. For example, the tool 120 and the part 110 are moved to the workstation 150. The tool 120 and the part 110 are then located relative to the workstation 150. The production machine 116 is then indexed relative to the tool 120 or the part 110. The machine-readable identifier 118 and/or the second machine-readable identifier 154 are then read. Then one or more manufacturing operations are performed on the part 110 using a partially automated work process or a manual work process of the continuous manufacturing process. Such manufacturing operations include subtractive manufacturing operations, additive manufacturing operations, and assembly operations performed on the part 110. In an example, the manufacturing operation is performed on a post-cure composite material or other material. In another example, the manufacturing operation is performed on a pre-cure composite material, such as composite layup operations and composite lamination operations.

In one or more examples of the system 102, the continuous process flow path 152 extends through the plurality of workstations 150 and the tool 120 and the part 110 move sequentially from one workstation 150 to a subsequent workstation 150. In other words, the continuous process flow path 152 links the workstations 150 together. In these examples, the system 102, the apparatus 100, and the method 1000 are implementations of a continuous manufacturing process in which at least a portion of one or more manufacturing operations is performed at each workstation 150.

In one or more examples, an entirety of the tool 120 and an entirely of the part 110 are located at one of the workstations 150 during performance of the manufacturing operation on the part 110, as the tool 120 and the part 110 travel (e.g., continuously or pulsed) through the system 102. In one or more other examples, the tool 120 and the part 110 extend between more than one workstation 150 during performance of more than one manufacturing operation on the part 110, as the tool 120 and the part 110 travel (e.g., continuously or pulsed) through the system 102. For example, a first portion (or first section) of the tool 120 and a first portion (or first section) of the part 110 are located at a first workstation 150 and a second portion (or second section) of the tool 120 and a second portion (or second section) of the part 110 are located at a second workstation 150. This arrangement is particularly advantageous for examples in which the tool 120 and the part 110 are large, elongate structures. For example, the part 110 may be a spar, a wing section, or a fuselage section of an aircraft and the tool 120 is configured to support and securely hold the large part 110.

Figure 13:
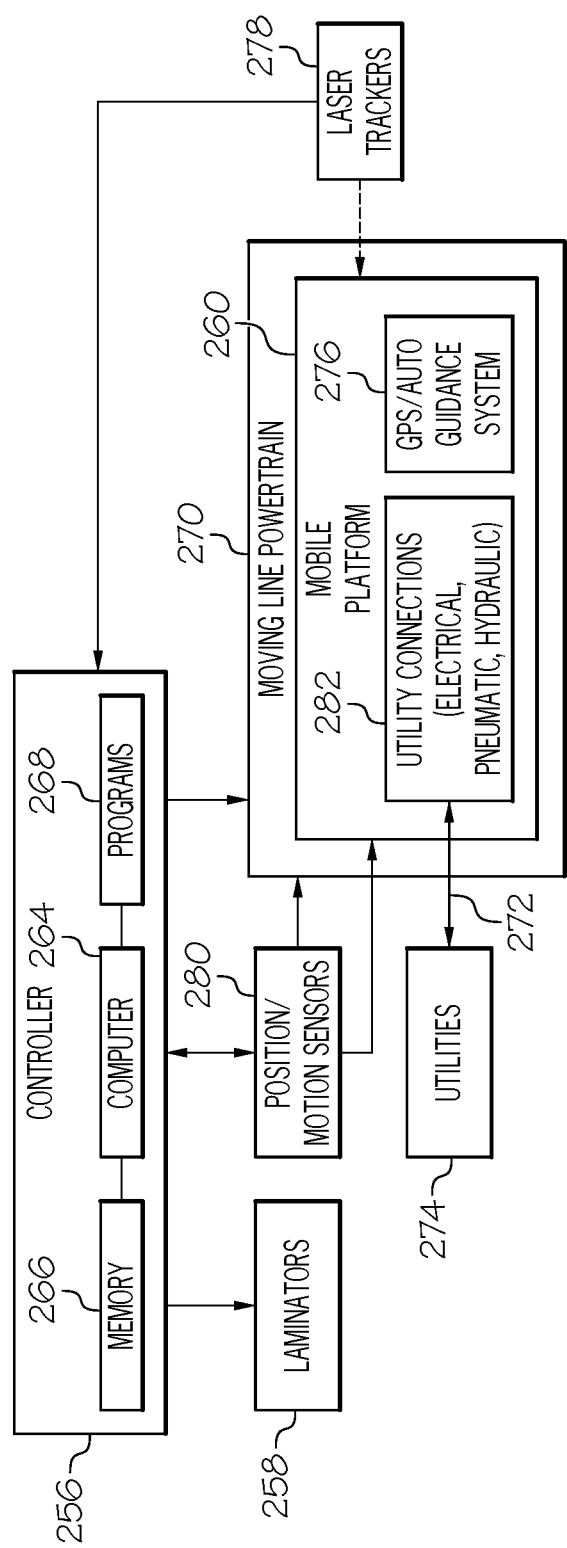
FIG. 13 is a schematic block diagram of an example of control components of the continuous flow manufacturing system.

Attention is now directed to FIG. 13, which broadly illustrates control components of one or more examples of the continuous flow manufacturing system 102 (FIG. 1), such as an example used to make a composite structure, such as the pre-cure composite laminate 164 (FIG. 4). A controller 256 coordinates and controls operation of laminators 258 and movement of mobile platforms 260 along a continuous process flow path 152 (FIG. 1). The controller 256 is an example of the computing device 126 (FIG. 1), the laminators 258 are examples of the production machines 116 (FIG. 1), and the mobile platform 260 is an example of the material handling device 156 (FIG. 6). The controller 256 also coordinates operation of the laminators 258 in examples where a portion of a ply applied by a laminator 258 in one workstation 150 (FIG. 1), and another portion of the same ply applied by a laminator 258 in an adjacent workstation 150. The controller 256 may include a computer 264, which is coupled with suitable memory 266 and control programs 268. In one example, the mobile platform 260 may be driven along the continuous process flow path 152 by a moving line powertrain 270, which is controlled by the controller 256. In this example, the mobile platform 260 may include appropriate utility connections 282, such as commercially available quick-connects 272, which may include electrical, pneumatic and hydraulic quick disconnects that couple the mobile platform 260 with external source of utilities 274. In other examples, as previously mentioned, the mobile platform 260 may include an automated guided vehicle (AGV) that may have on board utilities, as well as a Global Positioning System (GPS) and automated guidance system 276. In still other examples, the movement of the mobile platform 260 may be controlled using laser trackers 278. Suitable position and/or motion sensors 280 coupled with the controller 256 are used to determine the position of the mobile platforms 260 as well as the moving line powertrain 270.

Figure 14:
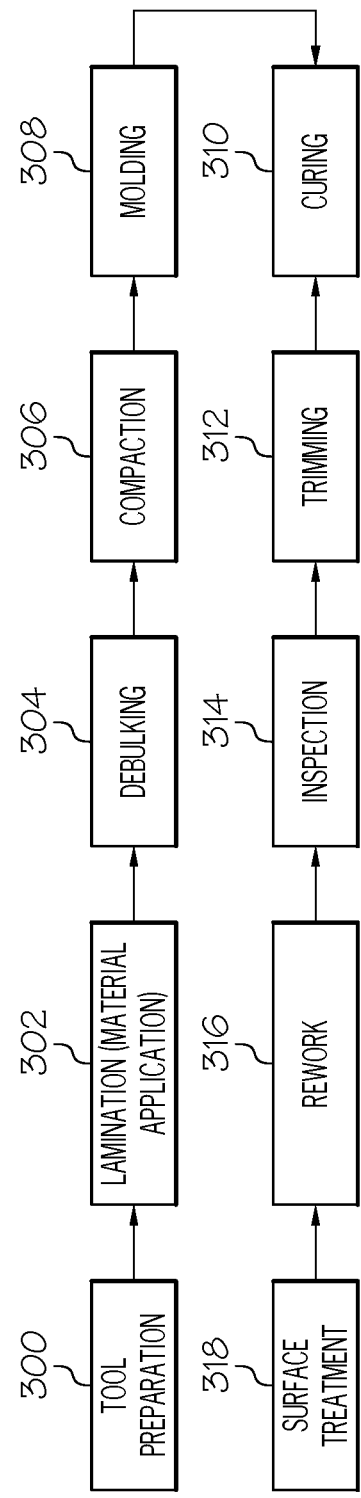
FIG. 14 is a flow diagram of an example of a continuous manufacturing operation.

In one or more examples, the workstations 150 (FIG. 1) are dedicated to lamination operations, however, principles of the continuous process flow path 152 (FIG. 1) described herein may include other types of operations that are normally required in the production of composite laminate parts. FIG. 14 illustrates an example of a continuous manufacturing operation, such as the continuous process flow path, that incorporates a variety of operations that may be required in the production of composite laminate parts. For example, any of the workstations 150 may include tool preparation 300 involving cleaning of or application of coatings to the tool 120 (FIG. 6), following which the tool 120 is transported by the mobile platform 260 to one or more workstation 150 where lamination operations (block 302)

are formed. The fully laid up part 110 may then be delivered on the continuous process flow path 152 to downstream workstations 150 where debulking (block 304) and compaction (block 306) of the part layout are performed.

Debulking (block 304) the part 110 may be carried out by vacuum compaction using, for example and without limitation, a vacuum bag. Compacting (block 306) the part 110 may also be carried out using vacuum compaction utilizing a vacuum bag or a vacuum bag and a caul plate. Further, the part 110 may be processed in additional workstations 150 where molding (block 308) the part 110, curing (block 310), trimming (block 312), inspection (block 314), rework (block 316), and/or surface treatment (block 318) operations may be performed. Molding (block 308) the part 110 may be carried out using precure forming, and/or a combination of molding between one side of the tool 120 and/or a combination of molding between one side of the tool 120 (FIG. 6) and a caul plate on the other side of the tool 120. Curing (block 310) the part 110 may be carried out using either autoclave or out-of-autoclave processing. Post cure trimming (block 312) of the cured part 110 may occur either before or after the part 110 is removed from the tool 120. In some applications, the trimming process (block 312) may involve a type of mass trimming of the part 110 before it is cured, followed by more specific trimming after the part 110 has been cured. Inspection (block 314) of the part 110 may include visual inspection as well as inspection using NDI (nondestructive inspection) equipment. Although reworking (block 316) the part 110 along the continuous process flow path 152 is possible, in some cases the part 110 may not require rework. One or more surfaces of the part 110 may be treated (block 318) using any of various techniques. For example, the surface treatment (block 318) may involve sealing trimmed edges and/or painting one or more surface areas of the part 110.

Figure 15:
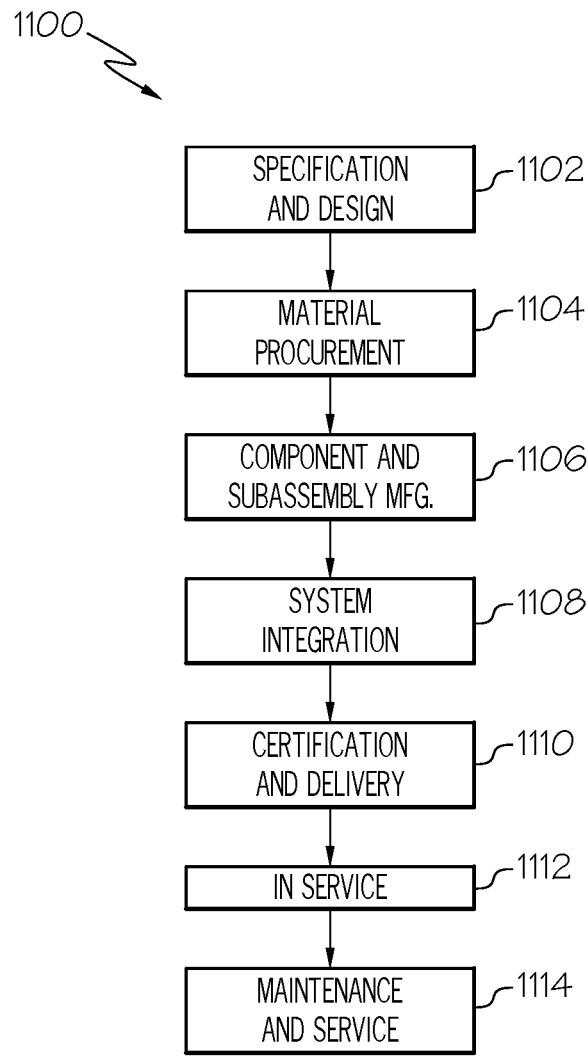
FIG. 15 is a flow diagram of an aircraft manufacturing and service methodology.
Figure 16:
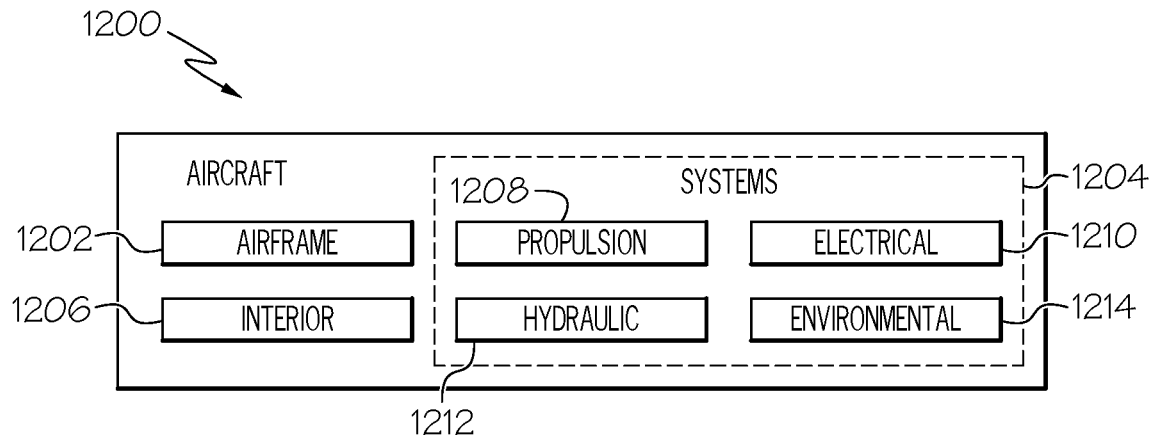
FIG. 16 is a schematic block diagram of an example of an aircraft.

Referring now to FIGS. 15 and 16, examples of the system 102, the apparatus 100, and the method 1000 may be used in the context of an aircraft manufacturing and service method 1100, as shown in the flow diagram of FIG. 15 and the aircraft 1200, as schematically illustrated in FIG. 16.

Referring to FIG. 16, in one or more examples, the aircraft 1200 includes the airframe 1202 and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, and the like. The part 110 manufactured using the system 102, under control of the apparatus 100, or in accordance with the method 1000 may be any one of a structure, an assembly, a sub-assembly, a component, a part, or any other portion of the aircraft 1200, such as a portion of the airframe 1202, the interior 1206, and one or more of the high-level systems 1204. For example, the part 110 may be any one of an aircraft spar, a wing section, a fuselage section, an interior panel, an exterior skin panel, and the like.

Referring to FIG. 15, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 15 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 102, the apparatus 100, and the method 1000 shown and described herein may be employed during any one or more of the stages of the manufacturing and service method 1100 shown in the flow diagram illustrated by FIG. 15. In an example, implementation of the disclosed system 102, apparatus 100, and method 1000 may form a portion of component and subassembly manufacturing (block 1106) and/or system integration (block 1108). For example, assembly of the aircraft 1200, the airframe 1202, and/or components thereof using implementations of the disclosed system 102, apparatus 100, and method 1000 may correspond to component and subassembly manufacturing (block 1106) and may be prepared in a manner similar to components or subassemblies prepared while the aircraft 1200 is in service (block 1112). Also, implementations of the disclosed system 102, apparatus 100, and method 1000 may be utilized during system integration (block 1108) and certification and delivery (block 1110). Similarly, implementations of the disclosed system 102, apparatus 100, and method 1000 may be utilized, for example and without limitation, while the aircraft 1200 is in service (block 1112) and during maintenance and service (block 1114).

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about" and "approximately" refer to or represent a condition that is close to, but not exactly, the stated condition that still performs the desired function or achieves the desired result. As an example, the terms "about" and "approximately" refer to a condition that is within an acceptable predetermined tolerance or accuracy. For example, the terms "about" and "approximately" refer to a condition that is within 10% of the stated condition. However, the terms "about" and "approximately" do not exclude a condition that is exactly the stated condition.

In FIGS. 1, 2A, 2B, 3A, 3B, 6-11, 13 and 16, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-11, 13 and 16, referred to above, need be included in every example and not all elements described herein are necessarily depicted in each illustrative example. Unless otherwise explicitly stated, the schematic illustrations of the examples depicted in FIGS. 1-11, 13 and 16, referred to above, are not meant to imply structural limitations with respect to the illustrative example. Rather, although one illustrative structure is indicated, it is to be understood that the structure may be modified when appropriate.

In FIGS. 12, 14 and 15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 12, 14 and 15, referred to above, and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 102, the apparatus 100, and the method 1000 have been shown and described, modifications may occur to those skilled in the art upon reading the specification. The present application includes such modifications and is limited only by the scope of the claims.

What is claimed is:

1. A continuous flow composite manufacturing system, comprising:
    a tool, configured to hold a composite laminate;
    a machine-readable identifier, associated with the tool and encoded with a tool- identification;
    a plurality of workstations arranged in series, wherein each one of the plurality of workstations comprises:
        a composite lamination machine, configured to perform one of a sequential series of composite lamination operations on the composite laminate as the tool, holding the composite laminate, moves sequentially through the plurality of workstations; and
        a reader, configured to read the machine-readable identifier;
    a material handling device, configured to transport the tool, holding the composite laminate, sequentially through the plurality of workstations along a continuous process flow path; and
    a computing device, configured to:
        retrieve process-data, associated with the tool-identification and a corresponding one of the plurality of workstations, wherein the process-data comprises a part-identification, corresponding to the composite laminate and associated with the tool-identification, a pre-operation condition of the composite laminate prior to performing one of the composite lamination operations, and operating instructions for the composite lamination machine associated with a corresponding one of the plurality of workstations and configured to perform the one of the composite lamination operations associated with a portion of the composite laminate situated in the corresponding one of the plurality of workstations;
        transmit the operating instructions to the composite lamination machine for execution by the composite lamination machine to perform the one of the composite lamination operations on the portion of the composite laminate situated in the corresponding one of the plurality of workstations; and
        update the process-data, subsequent to performing the one of the composite lamination operations associated with the portion of the composite laminate situated in the corresponding one of the plurality of workstations, wherein the process-data further comprises a post-operation condition of the composite laminate, subsequent to performing a previous one of the composite lamination operations.

2. The continuous flow composite manufacturing system of claim 1, wherein:
    the tool comprises a mandrel-tool; and
    the composite lamination machine comprises one of an automated fiber placement machine and an automated tape laying machine.

3. The continuous flow composite manufacturing system of claim 1, wherein:
    each one of the plurality of workstations further comprises an indexing device, configured to locate the tool; and
    the computing device is further configured to index the composite lamination machine relative to the tool or the composite laminate.

4. The continuous flow composite manufacturing system of claim 1, wherein:
the machine-readable identifier comprises a matrix barcode; and
the reader comprises an optical scanner.

5. The continuous flow composite manufacturing system of claim 1, wherein:
the machine-readable identifier comprises a radio-frequency identification tag; and
the reader comprises a radio-frequency identification reader.

6. The continuous flow manufacturing system of claim 1, wherein the process-data further comprises
a part-geometry of the composite laminate, associated with the part-identification.

7. The continuous flow manufacturing system of claim 1, wherein the process-data further comprises at least one of:
operation-information, representing the one of the composite lamination operations performed on the composite laminate; and
inspection-information, representing at least one of a quality of the composite laminate and a non-conformance of the composite laminate following the one of the composite lamination operations.

8. A method for fabricating a portion of an aircraft using the continuous flow composite manufacturing system of claim 1.

9. The continuous flow composite manufacturing system of claim 1, wherein the computing device is further configured to modify the operating instructions for the composite lamination machine based on the post-operation condition of the composite laminate after performing a previous one of the composite lamination operations.

10. An apparatus for controlling a continuous flow composite manufacturing system, the apparatus comprising:
a database, comprising process-data associated with the continuous flow composite manufacturing system, wherein the process-data comprises:
a part-identification, corresponding to a composite laminate;
a pre-operation condition of the composite laminate, prior to performing a composite laminate operation on the composite laminate; and
operating instructions for a composite laminate machine, configured to perform the composite laminate operation;
a machine-readable identifier, associated with a tool, holding the composite laminate, and encoded with a tool-identification;
a reader, configured to read the machine-readable identifier; and
a computing device, in communication with the database, the composite lamination machine and the reader, wherein the computing device is configured to:
identify the tool using the tool-identification;
associate the tool-identification with the process-data, corresponding to the composite laminate and a workstation of the continuous flow composite manufacturing system;
retrieve the operating instructions from the database;
transmit the operating instructions to the composite lamination machine to control operation of the composite lamination machine to perform the composite lamination operation; and
update the process-data, as the tool holding the composite laminate moves sequentially through a plurality of workstations of the continuous flow composite manufacturing system, to further comprise a post-operation condition of the composite laminate, subsequent to performing the composite lamination operation.

11. The apparatus of claim 10, wherein the pre-operation condition of the composite laminate comprises a part-geometry of the composite laminate, prior to performing the composite lamination operation.

12. The apparatus of claim 10, wherein the pre-operation condition of the composite laminate comprises operation-information, representing a preceding composite lamination operation performed on the composite laminate.

13. The apparatus of claim 10, wherein the post-operation condition of the composite laminate comprises a modified part-geometry of the composite laminate, subsequent to performing the composite lamination operation.

14. The apparatus of claim 10, wherein the post-operation condition of the composite laminate comprises operation-information, representing the composite lamination operation performed on the composite laminate.

15. The apparatus of claim 10, wherein the post-operation condition of the composite laminate comprises inspection-information representing a quality of the composite laminate, subsequent to performing the composite lamination operation and inspection of the composite laminate.

16. The apparatus of claim 10, wherein the post-operation condition of the composite laminate comprises inspection-information, representing a non-conformance of the composite laminate, subsequent to performing the composite lamination operation on the composite laminate.

17. The apparatus of claim 10, wherein:
the tool comprises a mandrel-tool; and
the composite lamination machine comprises one of an automated fiber placement machine and an automated tape laying machine.

18. The apparatus of claim 10, wherein:
the machine-readable identifier comprises a matrix barcode; and
the reader comprises an optical scanner.

19. The apparatus of claim 10, wherein:
the machine-readable identifier comprises a radio-frequency identification tag; and
the reader comprises a radio-frequency identification reader.

20. The apparatus of claim 10, wherein the computing device is further configured to index the composite lamination machine relative to the tool or the composite laminate.

21. The apparatus of claim 20, wherein:
the process-data comprises a tool-geometry of the tool;
the computing device is further configured to:
transform the tool-geometry to a tool-location of the tool; and
index the composite lamination machine relative to the tool-location.

22. A method for fabricating a portion of an aircraft using the apparatus of claim 10.

23. The apparatus of claim 10, wherein the computing device is further configured to modify the operating instructions for the composite lamination machine based on the post-operation condition of the composite laminate after performing the composite lamination operation.

24. A method for controlling a continuous flow composite manufacturing system, the method comprising:
identifying a tool at each one of a plurality of workstations of the continuous flow composite manufacturing system, wherein each one of the workstations comprises a composite lamination machine that implements a composite lamination operation performed on a composite laminate held by the tool as the tool holding the composite laminate moves sequentially through the plurality of workstations;

associating a tool-identification, corresponding to the tool, with process-data associated with the composite laminate and the workstation, wherein the process-data comprises:
- a part-identification, corresponding to the composite laminate;
- a pre-operation condition of the composite laminate, prior to performing the composite lamination operation; and
- operating instructions for the composite lamination machine to perform the composite lamination operation;

retrieving, from a database, the operating instructions for the composite lamination machine;

transmitting the operating instructions to the composite lamination machine;

performing the composite lamination operation on the composite laminate using the composite lamination machine executing the operating instructions; and updating the process-data to further comprise a post-operation condition of the composite laminate, subsequent to performing the composite lamination operation.

25. The method of claim 24, further comprising modifying the operating instructions for the composite lamination machine based on the post-operation condition of the composite laminate after performing the composite lamination operation.

* * * * *